(12) United States Patent
Someya et al.

(10) Patent No.: US 6,323,623 B1
(45) Date of Patent: Nov. 27, 2001

(54) CHARGING DEVICE AND CHARGING METHOD THEREOF

(75) Inventors: Kaoru Someya, Kiyose; Shinobu Sumi, Tama, both of (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/640,631

(22) Filed: Aug. 17, 2000

(30) Foreign Application Priority Data

Aug. 23, 1999 (JP) ................................. 11-235260
Aug. 23, 1999 (JP) ................................. 11-235392

(51) Int. Cl.$^7$ ....................................... H02J 7/00
(52) U.S. Cl. ................................. 320/166; 320/121
(58) Field of Search ................................. 320/166, 116, 320/120, 121, 126, 167; 307/110; 363/89

(56) References Cited

U.S. PATENT DOCUMENTS

| 5,369,351 | * 11/1994 | Adams  | 320/121 |
| 5,528,121 | * 6/1996 | Okamura | 320/167 |
| 5,844,792 | * 12/1998 | Moreau | 320/166 |

FOREIGN PATENT DOCUMENTS

| 8-168182 | 6/1996 | (JP) . |
| 8-205524 | 8/1996 | (JP) . |
| 11-122811 | 4/1999 | (JP) . |

* cited by examiner

*Primary Examiner*—Peter S. Wong
*Assistant Examiner*—Lawrence Luk
(74) *Attorney, Agent, or Firm*—Frishauf, Holtz, Goodman, Langer & Chick, P.C.

(57) ABSTRACT

The present invention relates to a charging device for storing electric energy in a plurality of electrical double layer capacitors, comprising a power source circuit, a capacitor bank having a plurality of capacitors, a control circuit for switching an interconnection state of the plurality of capacitors, and a voltage monitor circuit for monitoring a charged voltage in the plurality of capacitors, which repetitively carries out a step of performing a charging operation by switching the plurality of capacitors in the capacitor bank to a serial connection state, and a step of monitoring a charged voltage by using a voltage monitor circuit by switching the plurality of capacitors to a parallel connection state until the charged voltage reaches a predetermined value. By connecting the plurality of capacitors in series when charging the same, the power source circuit can be downsized as the charging current is reduced, and by connecting the same in parallel when monitoring the voltage, each capacitor can be charged equally as a voltage in each capacitor is leveled. Further, because the voltage monitor circuit can be a single circuit, not only can the size and cost of the charging device be reduced significantly, but also a heat quantity generated from the voltage monitor circuit can be suppressed markedly, thereby making it possible to

33 Claims, 19 Drawing Sheets

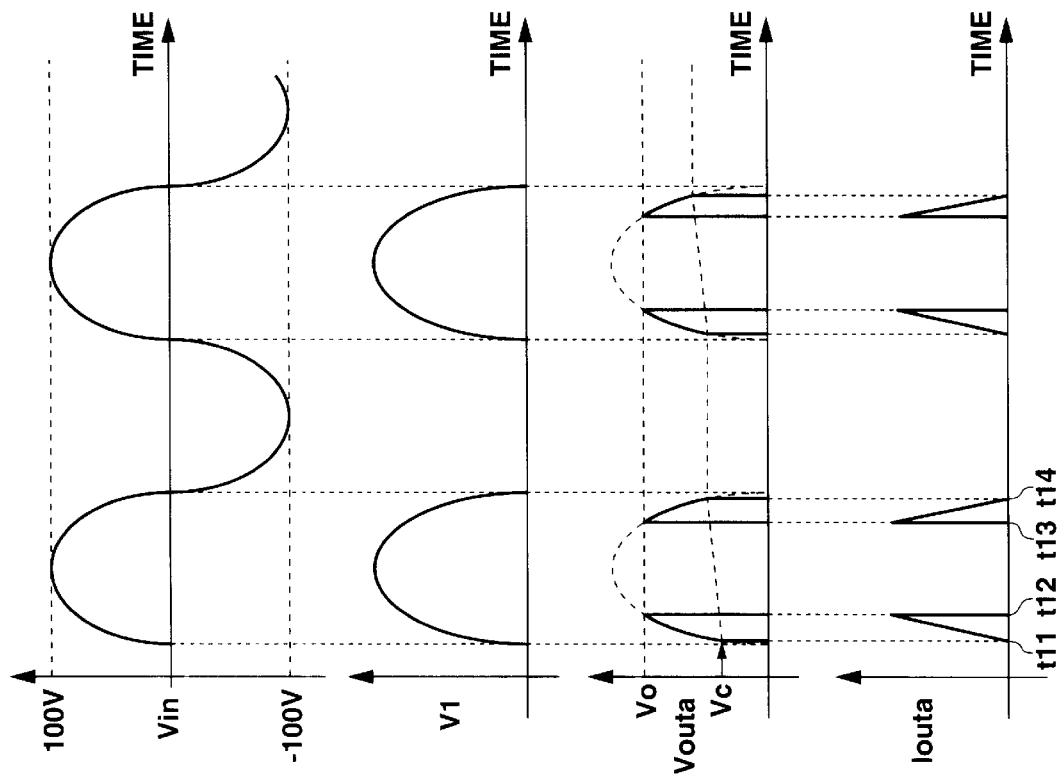

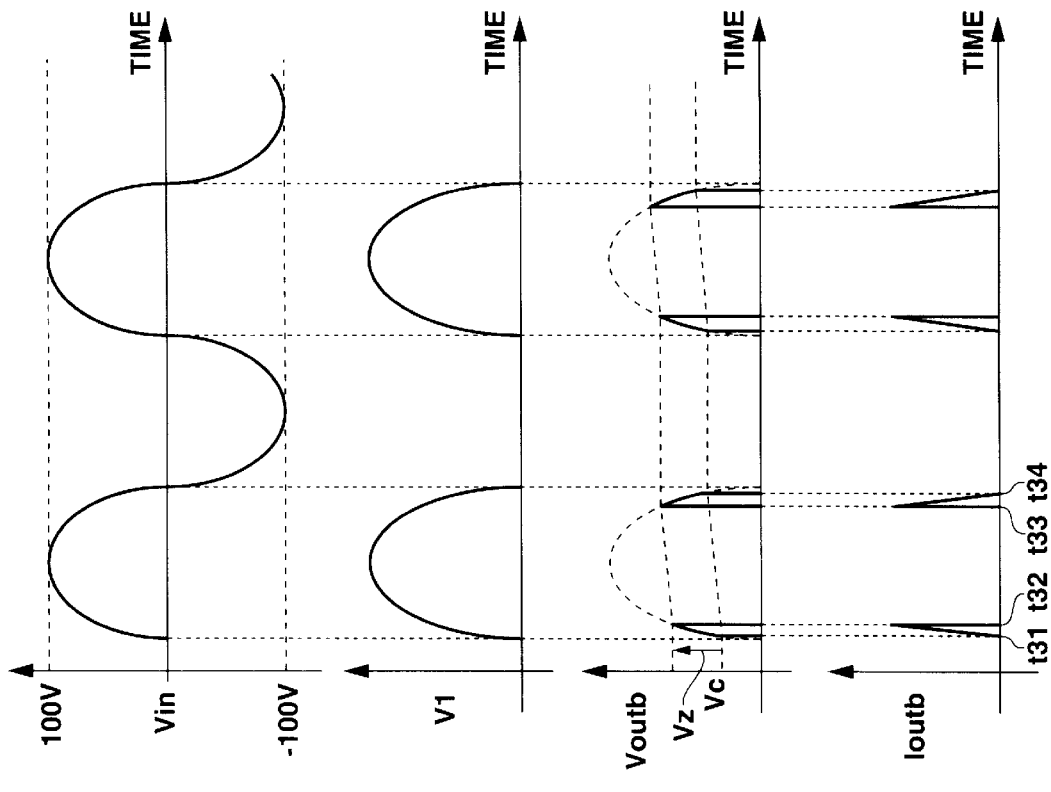

CHARGING DEVICE AND CHARGING METHOD THEREOF

CROSS-REFERENCE TO RELATED APPLICATIONS

This application is based upon and claims the benefit of priority from the prior Japanese Patent Applications No. 11-235260, filed Aug. 23, 1999; and No. 11-235392, filed Aug. 23, 1999, the entire contents of which are incorporated herein by reference.

BACKGROUND OF THE INVENTION

The present invention relates to a charging device for accumulating electric energy in a capacitor bank having a plurality of capacitors as power elements, and a charging method thereof.

Recently, a study has been conducted to accumulate electric energy in an electrical double layer capacitor and use the accumulated electric energy as a driving power source of an electric vehicle or the like. Meanwhile, a charging device for storing electric energy in a plurality of electrical double layer capacitors has been developed.

FIG. 19A is a block diagram showing a major portion of a conventional arrangement of such a charging device, and FIG. 19B is a view explaining an operation of the charging device.

As shown in FIG. 19A, the charging device comprises a power source circuit 110 for supplying a charging current, a capacitor bank 120 composed of a plurality of electrical double layer capacitors C11–C14 connected in series, and parallel monitor circuits 130A–130D respectively connected to the electrical double layer capacitors C11–C14, and the device is arranged in such a manner that, by supplying the capacitor bank 120 with a predetermined charging current IC from the power source circuit 110, charges corresponding to the charging current IC are accumulated in each of the electrical double layer capacitors C11–C14.

Generally, a voltage (charged voltage) V across a capacitor including the electrical double layer capacitor is expressed by the following equation:

$$V=Q/C \quad (1)$$

where Q is a charge quantity and C is a capacity of the capacitor.

The charge quantity Q is expressed by the following equation:

$$Q=I \cdot t \quad (2)$$

where I is a current flowing through the capacitor, that is, a charging current, and t is a charging time.

Hence, the charged voltage V is expressed by the following equation:

$$V=(1/C) \cdot I \cdot t \quad (3).$$

That is, if the charging current I is constant, the charged voltage V increases as the charging time t extends. It should be noted that the voltage (charged voltage) V across the capacitor has a tolerance limit value (withstand proof voltage), and if the charged voltage V exceeds the withstand proof voltage of the capacitor, the capacitor is damaged or deteriorated, or the charging device breaks. Therefore, when charging the capacitor, the charging operation should be controlled so that the charged voltage will not exceed the withstand proof voltage of the capacitor.

For this reason, as shown in FIG. 19A, the conventional charging device is arranged in such a manner that the parallel monitor circuits 130A–130D are provided to the respective electrical double layer capacitors C11–C14, so that the parallel monitor circuits 130A–130D detect and monitor the terminal voltages of their respective capacitors C11–C14 as the charged voltages. In other words, as shown in FIG. 19B, the conventional charging device is arranged in such a manner that, let VL be the withstand proof voltage of the capacitors, then when the charged voltage in each capacitor exceeds the withstand proof voltage VL, the charging device bypasses the charging current IC to the parallel monitor circuits 130A–130D side, thereby stopping the charging operation for the electrical double layer capacitors.

In the foregoing conventional charging device, however, in order to charge a plurality of electrical double layer capacitors connected in series, a voltage monitor circuit for detecting and monitoring the charged voltage has to be connected to each electrical double layer capacitor in parallel. For this reason, the conventional charging device has a problem that its size undesirably increases as the number of the electrical double layer capacitors used therein increases, and so does the cost of production.

In addition, the conventional charging device is arranged in such a manner that, when the value of the charged voltage exceeds the predetermined withstand proof voltage, the charging current is bypassed to the parallel monitor circuits. Thus, a heat quantity is generated in response to the power consumption of the parallel monitor circuits. In other words, as shown in FIG. 19B, the heat quantity W generated in the charging device by bypassing the charging current is expressed by the following equation:

$$W=IC \cdot VL \cdot n \quad (4)$$

where IC is the charging current, VL is the withstand proof voltage of the electrical double layer capacitors, and n is the number of the parallel monitor circuits. Hence, the heat quantity W generated by the voltage monitor circuits provided in the charging device increases in proportion to the number n of the voltage monitor circuits provided in the charging device. Also, the number of the voltage monitor circuits corresponds to the number of the electrical double layer capacitors used in the charging device. Therefore, the conventional charging device has a problem that a larger heat quantity is generated as the number of the electrical double layer capacitors used therein increases, and downsizing the charging device becomes more difficult as the number of the electrical double layer capacitors used therein increases.

BRIEF SUMMARY OF THE INVENTION

It is therefore an object of the present invention to provide a markedly downsized, inexpensive charging device capable of accumulating electric energy in a capacitor bank composed of a plurality of capacitors including electrical double layer capacitors, and a charging method thereof.

In order to achieve the above object, a charging device of the present invention includes a power source circuit for supplying a charging current, a capacitor bank having a plurality of capacitors and changeover switches for switching an interconnection state of the plurality of capacitors, a connection control circuit for switching the plurality of capacitors from a serial connection state to a parallel connection state and vice versa by controlling the changeover switches, and a voltage monitor circuit for controlling a charging state of the plurality of capacitors by monitoring a charged voltage therein, and the charging device is arranged such that the connection control circuit connects the plurality of capacitors in series and to the power source circuit when charging the plurality of capacitors, and when monitoring the charged voltage, connects the plurality of capacitors in parallel and disconnects the plurality of capacitors from the power source circuit, and monitors the charged voltage by using the voltage monitor circuit.

In addition, a charging method of the present invention is characterized by repetitively carrying out a step of performing a charging operation, in which the plurality of capacitors are switched to the serial connection state and connected to the power source circuit by controlling the changeover switches in the capacitor bank, and a step of disconnecting the plurality of capacitors from the power source circuit, switching the plurality of capacitors to the parallel connection state, and reconnecting the plurality of capacitors to the voltage monitor circuit to monitor a charged voltage in the capacitors by controlling the changeover switches.

Also, the charging method is characterized in that, in the charged voltage monitoring step, the charged voltage in the capacitors is compared with a preset reference voltage based on the withstand voltage of the capacitors, and when the former reaches or exceeds the latter, the charging operation is ended by cutting the supply of the charging current from the power source circuit.

As has been discussed, according to the charging device and the charging method thereof of the present invention, by connecting the plurality of capacitors in series when charging the same, the power source circuit can be downsized as the charging current supplied to the capacitors is reduced, or the charging time can be shortened without changing the charging current.

In addition, by connecting the plurality of capacitors in parallel when monitoring the charged voltage therein, the charged voltage in each capacitor is leveled, and the irregularities in characteristics among the capacitors are absorbed, thereby making it possible to charge all the capacitors equally.

Further, the voltage monitor circuit for monitoring the charged voltage in the capacitors can be a single circuit regardless of the number of capacitors in the capacitor bank. Thus, the size and cost of the charging device can be reduced markedly. Also, unlike the parallel monitor circuits employed in the conventional charging device, the voltage monitor circuit does not include an arrangement such that bypasses the charging current. Thus, a heat quantity from the voltage monitor circuit can be suppressed significantly, and the charging device can be downsized further.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 16A to 16D are waveform charts showing voltage and current waveforms representing an operation of the first embodiment of the power source circuit;

FIGS. 18A to 18D are waveform charts showing voltage and current waveforms representing an operation of the second embodiment of the power source circuit.

DETAILED DESCRIPTION OF THE INVENTION

There will be detailed below a charging device and a charging method thereof in accordance with the present invention with reference to the preferred embodiments shown in the accompanying drawings.

Figure 1:
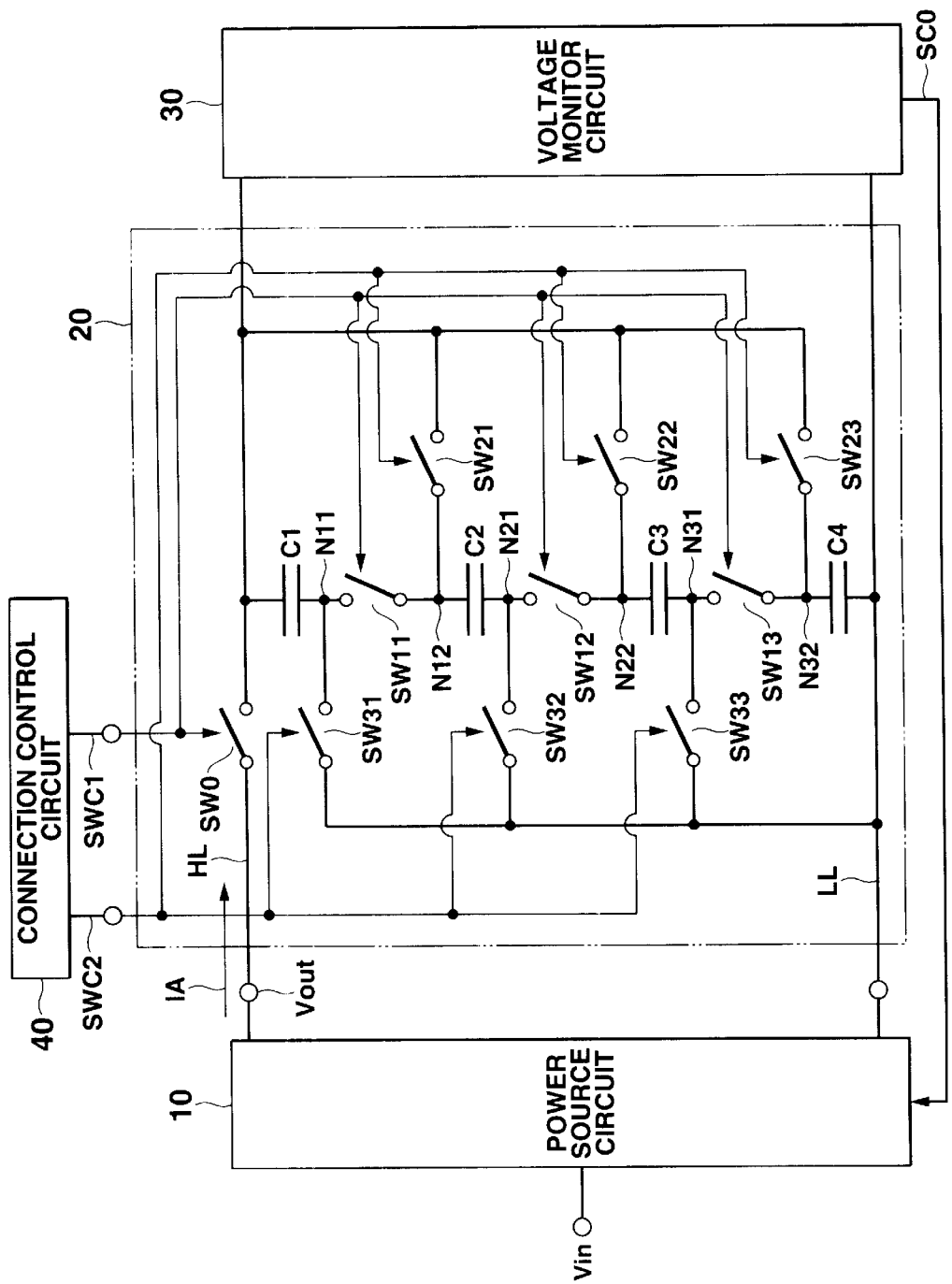
FIG. 1 is a circuit block diagram showing an arrangement of a charging device in accordance with an embodiment of the present invention.

FIG. 1 is a circuit block diagram showing an arrangement of a charging device in accordance with one embodiment of the present invention.

As shown in FIG. 1, the charging device of the present embodiment includes a power source circuit 10 forming power source means for supplying a charging current, a capacitor bank 20 having a plurality of electrical double layer capacitors (hereinafter, referred to simply as capacitors) and furnished with a function of switching an interconnection state of the capacitors, a voltage monitor circuit 30 forming voltage monitor means, and a connection control circuit 40 for controlling an interconnection state of the capacitors in the capacitor bank 20.

The power source circuit 10 is connected to, for example, a commercial AC power source at its input terminal Vin and provided with an AC voltage, based on which a predetermined DC voltage or pulsating flow is generated. The power source circuit 10 applies the generated DC voltage or pulsating flow across a high potential side power source line HL and a low potential side power source LL to both of which the capacitor bank 20 is connected, whereby a charging current IA is supplied to the capacitor bank 20.

The capacitor bank 20 is arranged as follows. A capacitor C1, a changeover switch SW11, a capacitor C2, a changeover switch SW12, a capacitor C3, a changeover switch SW13, and a capacitor C4 are connected in series respectively by means of contact points N11, N12, N21, N22, N31, and N32 between the high potential side power source line HL and low potential side power source line LL.

Changeover switches SW21–SW23 are provided between the high potential side power source line HL and contact point N12, the high potential side power source line HL and contact point N22, and the high potential side power source line HL and contact point N32, respectively.

Likewise, changeover switches SW31–SW33 are provided between the low potential side power source line LL and contact point N11, the low potential side power source line LL and the contact point N21, and the low potential side power source line LL and contact point N31, respectively.

Further, a switch SW0 for controlling the supply of the charging current IA to a serial connection structure composed of the capacitors C1–C4 and changeover switches SW11–SW13 is provided on the high potential side power source line HL.

The operations of the foregoing changeover switches provided in the capacitor bank 20 are controlled by a control signal supplied from the connection control circuit 40.

More specifically, the ON/OFF actions of the changeover switches SW11–SW13 and switch SW0 are controlled simultaneously at predetermined timing based on a control signal SWC1 supplied from the connection control circuit 40.

The ON/OFF actions of the changeover switches SW21–SW23 and SW31–SW33 are controlled collectively at the opposite timing to the timing of the changeover switches SW11–SW13 and switch SW0 based on a control signal SWC2 supplied from the connection control circuit 40.

The capacitor bank 20 shown in FIG. 1 is a case where four capacitors C1–C4 and corresponding switches are provided. However, it should be appreciated that the foregoing is an example, and any desired number of capacitors can be used. In addition, each of the capacitors C1–C4 can be a single capacitor or a capacitor stack composed of a plurality of capacitors.

The voltage monitor circuit 30 is connected to both the high potential side power source line HL and low potential side power source line LL. The voltage monitor circuit 30 detects a charged voltage based on a quantity of charges accumulated in each of the capacitors C1–C4 as a monitor voltage value, compares the same with a predetermined reference voltage value based on the withstand proof voltage of the capacitors C1–C4, and judges whether or not the former has reached the latter.

When the monitor voltage value has reached the reference voltage value, the voltage monitor circuit 30 outputs a control signal SC0 to the power source circuit 10, and stops the supply of the charging current IA to the capacitor bank 20 by the control signal SC0.

The following description will explain an operating state of the charging device of the present embodiment with reference to corresponding drawings.

<Charging Operation>

Figure 2:
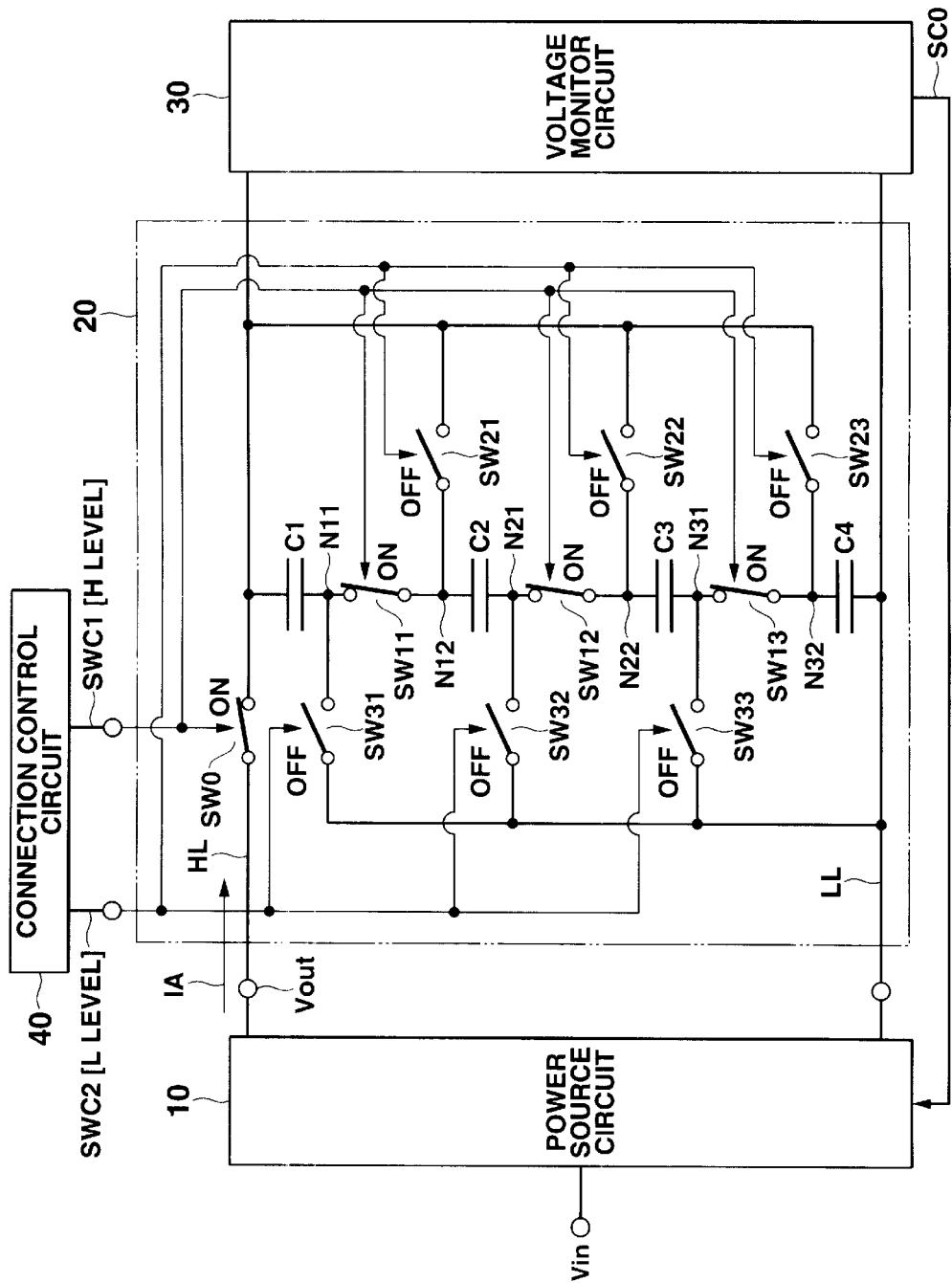
FIG. 2 is a circuit block diagram showing a state during a charging operation of the charging device in accordance with the embodiment of the present invention.
Figure 3:
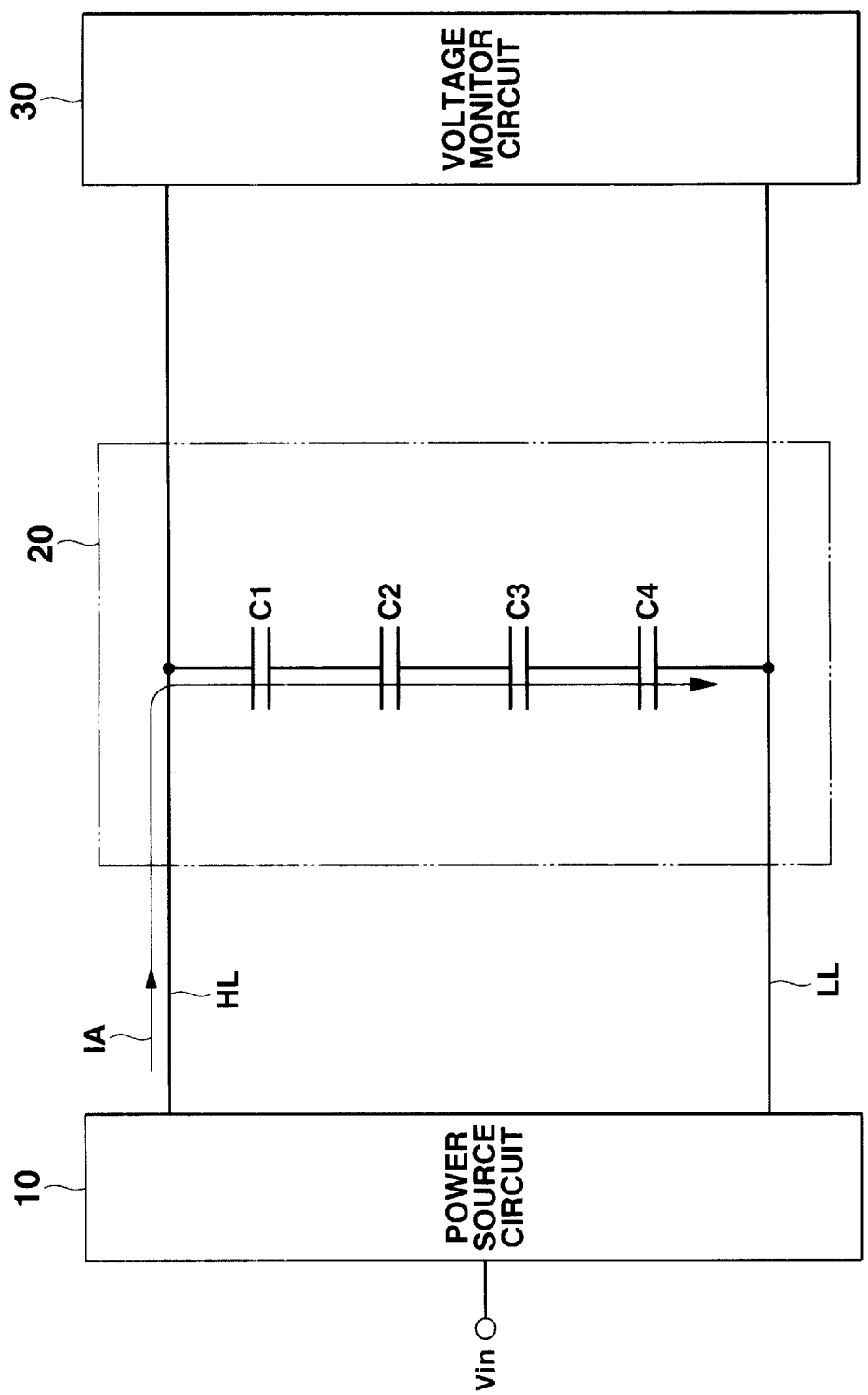
FIG. 3 shows an equivalent circuit representing a connection state of capacitors during the charging operation of the charging device in accordance with the embodiment of the present invention.

FIG. 2 is a circuit block diagram showing a connection state of each capacitor in the capacitor bank 20 during the charging operation of the charging device of the present embodiment, and FIG. 3 shows an equivalent circuit representing a connection state of the capacitors in the capacitor bank 20 during the charging operation.

As shown in FIG. 2, during the charging operation, the control is effected in such a manner that the changeover switch SW0 on the high potential side power source line HL is switched ON to establish an electrical conduction between the power source circuit 10 and capacitor bank 20 and the changeover switches SW11–SW13 in the capacitor bank 20 are switched ON by the control signal SWC1 from the connection control circuit 40, while the changeover switches SW21–SW23 and SW31–SW33 are switched OFF collectively by the control signal SWC2.

According to the switch control on the changeover switches SW0, SW11–SW13, SW21–SW23, and SW31–SW33, the capacitor bank 20 is in the state where the capacitors C1–C4 are connected in series between the high potential side power source line HL and low potential side power source line LL like the equivalent circuit shown in FIG. 3. Consequently, the charging current IA supplied to the high potential side power source HL from the power source circuit 10 is supplied to each of the capacitors C1–C4, whereupon the charging starts.

<Voltage Monitoring Operation>

Figure 4:
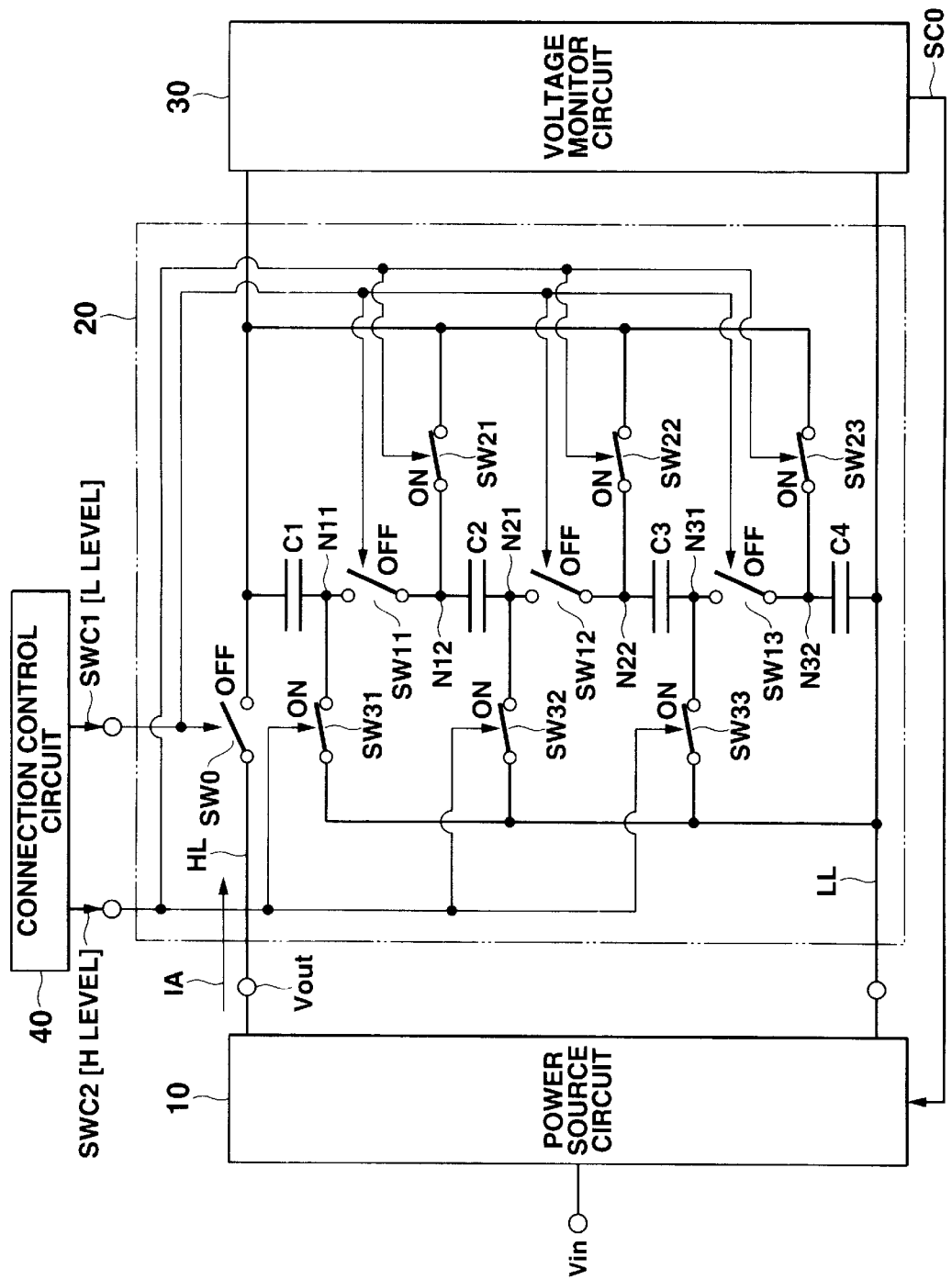
FIG. 4 is a circuit block diagram showing a state during a voltage monitoring operation of the charging device in accordance with the embodiment of the present invention.
Figure 5:
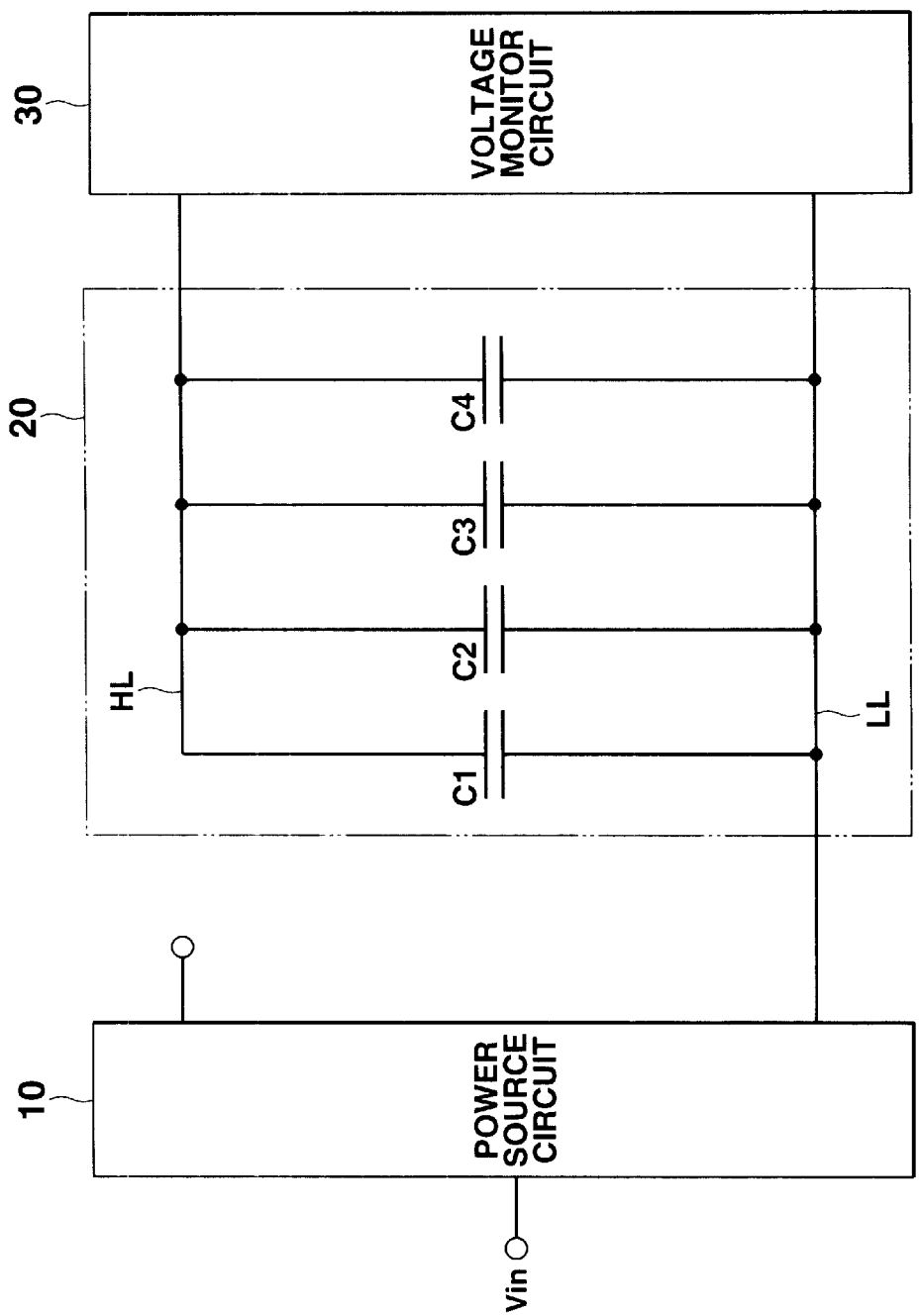
FIG. 5 shows an equivalent circuit representing a connection state of capacitors during the voltage monitoring operation of the charging device in accordance with the embodiment of the present invention.

FIG. 4 is a circuit block diagram showing a connection state of each capacitor in the capacitor bank 20 during the voltage monitoring operation of the charging device of the present embodiment, and FIG. 5 shows an equivalent circuit showing the connection state of the capacitors in the capacitor bank 20 during the voltage monitoring operation.

As shown in FIG. 4, during the voltage monitoring operation, the control is effected in such a manner that the changeover switch SW0 on the high potential side power source line HL is switched OFF to cut the electrical connection between the power source circuit 10 and capacitor bank 20 and the changeover switches SW11–SW13 in the capacitor bank 20 are switched OFF by the control signal SWC1 from the connection control circuit 40, while the changeover switches SW21–SW23 and SW31–SW33 are collectively switched ON by the control signal SWC2.

According to the above switch control on the changeover switches SW0, SW11–SW13, SW21–SW23, and SW31–SW33, the capacitor bank 20 is in the state where the capacitors C1–C4 are connected in parallel between the high potential side power source line HL and low potential side power source line LL like the equivalent circuit shown in FIG. 5. Consequently, a voltage charged in each of the capacitors C1–C4 is leveled, and the single voltage monitor circuit 30 is connected to the capacitors C1–C4 commonly, whereby the leveled voltage is detected as the charged voltage.

The voltage monitor circuit 30 compares the detected charged voltage with the reference voltage, and when the former reaches the latter, it outputs the control signal SC0 to the power source circuit 10, whereupon the supply of the charging current IA is stopped.

<Discharging Operation>

Figure 6A:
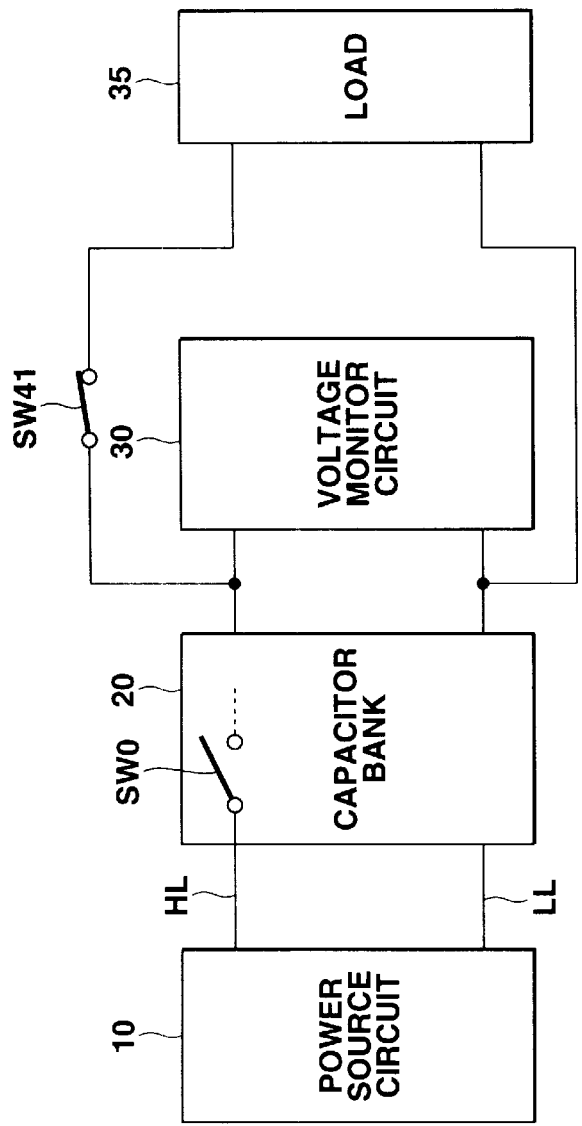
FIGS. 6A and 6B are circuit block diagrams showing a state during the discharging operation of the charging device in accordance with the embodiment of the present invention.
Figure 6B:
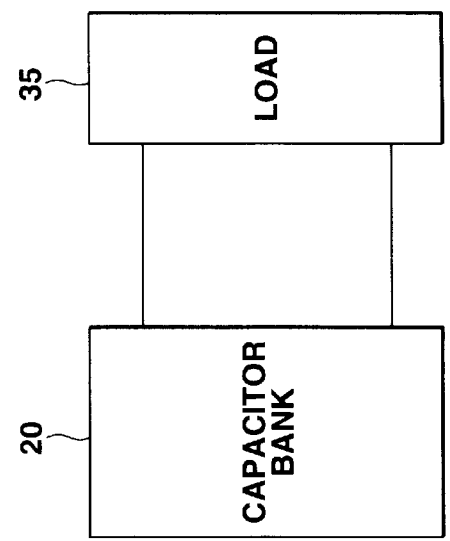

FIG. 6A and FIG. 6B are circuit block diagrams showing the state of the charging device of the present embodiment during the discharging operation. The connection control circuit 40 is omitted from the drawings for ease of explanation. Although a switch control circuit is necessary to control the ON/OFF action of a switch SW41 as will be discussed below, it is also omitted from the figures for ease of explanation.

In an arrangement in which the voltage monitor circuit 30 and a load 35 are connected in parallel through the SW41 between the high potential side power source line HL and low potential side power source line LL, during the discharging operation, the control is effect in such a manner that, as shown in FIG. 6A, the changeover switch SW0 on the high potential side power source HL is switched OFF to cut the electrical connection between the power source circuit 10 and capacitor bank 20 by the connection control circuit, while the switch SW41 provided between the capacitor bank 20 and load 35 is switched ON by an unillustrated switch control circuit. Consequently, as shown in FIG. 6B, the capacitor bank 20 and load 35 are electrically connected to each other, and accumulation energy based on the charges accumulated in the capacitor bank 20 by the charging is supplied to the load 35.

During the discharging state, the connection state of the capacitors C1–C4 in the capacitor bank 20 is switched from serial to parallel or vice versa as necessary depending on the state of the load 35 under control, so that the load 35 is supplied with adequate accumulation energy.

Figure 7A:
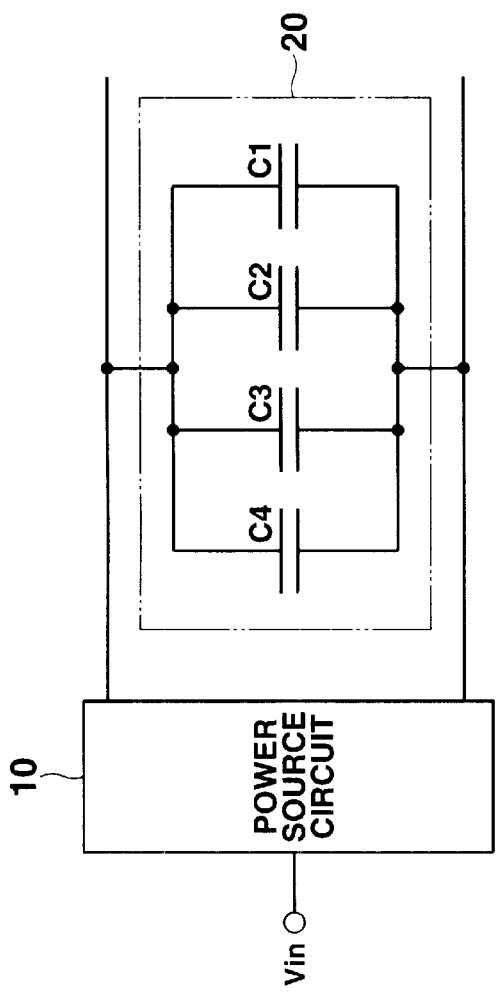
FIGS. 7A and 7B are circuit diagrams explaining a function of capacitors forming a capacitor bank in the charging device of the present invention depending on a connection state thereof.
Figure 7B:
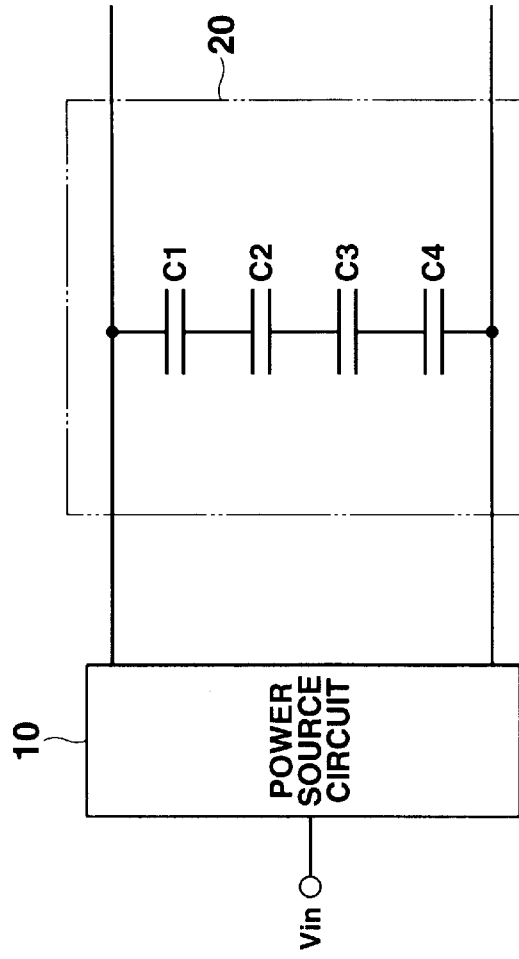

Next, the following description will describe a connection state of the capacitors forming the capacitor bank and the function thereof with referenced to the corresponding drawings. FIG. 7A and FIG. 7B are circuit diagrams showing the function of the capacitors forming the capacitor bank employed in the present embodiment depending on the connection state.

When a voltage V(V) is generated across a capacitor having a capacity C(F), accumulation energy E is generally expressed by the following equation:

$$E = \tfrac{1}{2} \cdot CV^2 \tag{5}$$

It is understood from Equation (5) that the accumulation energy E is in proportion to the square of the voltage V. Let I(A) be the charging current and t(s) be the charging time, then a charge quantity Q accumulated in the capacitor is expressed as:

$$Q = \int I\,dt = I \cdot t \tag{6}$$

and the relation of the charge quantity Q versus the capacitor C and the voltage V across the capacitor is generally expressed as:

$$Q = CV \tag{7}$$

Hence, Equation (5) above is rewritten as the following equation:

$$E = (\tfrac{1}{2}) C \cdot (Q/C)^2 = (\tfrac{1}{2}C) \cdot (I \cdot t)^2 \tag{8}$$

It is derived from Equation (8) above that if the accumulation energy E is constant, then the charging current I is inversely proportional to the charging time t.

By modifying Equation (8) above, the charging current I is expressed by the following equation:

$$I = \sqrt{(2EC)}/t \tag{9}$$

It is derived from Equation (9) above that if the accumulation energy E and charging time t are constant, the charging current I during the charging operation varies in proportion to the square root of the capacity C of the capacitor. The function in the present embodiment will be explained based on the foregoing relation.

Let C be a capacity value of the capacitors in the capacitor bank 20, and assume that the capacity C is composed of n capacitors which are equally divided and connected in parallel as shown in FIG. 7A. FIG. 7A shows a case where the capacity C is divided into four capacitors C1–C4.

When the capacitor bank 20 is charged, the divided capacitors are connected in series as shown in FIG. 7B. In this case, a capacity C' of the capacitor bank 20 during the charging is $C/(n^2)$, which is $1/(n^2)$ times greater than the capacity in a case where the capacitor bank 20 is composed of a single capacitor.

When the accumulation energy E is accumulated in the capacitor bank 20, let C be the capacity value of the capacity bank 20, then the charging current is a value expressed by Equation (9) above. On the contrary, when the same accumulation energy E is accumulated under the condition that the capacitors are connected in series and the capacity C of the capacitor bank 20 reaches $C/(n^2)$, then a charging current I' is expressed by the following equation:

$$I' = \sqrt{(2EC')}/t = \sqrt{(2EC/n^2)}/t = I/n \tag{10}$$

Thus, if the capacitor is divided into n capacitors, and charged by connecting the n capacitors in series, the charging current is reduced to 1/n compared with a case where the capacitor is composed of a single capacitor.

In other words, when charging the capacitor, there is a problem that a larger charging current has to be flown to shorten the charging time, which undesirably increases the size of the power source circuit. However, according to the charging device of the present invention, as has been discussed above, if a quantity of accumulation energy accumulated in the capacitor bank 20 is constant, by dividing the capacitor bank 20 into n (n≧2) capacitors and connecting the same in series when charging the capacitor bank 20, the capacity value of the capacitor bank 20 during the charging is reduced to $1/n^2$ depending on the number n of the divided capacitors, and the charging current is reduced to 1/n, thereby making it possible to downsize the power source circuit. Also, as previously mentioned, if a quantity of the accumulation energy is constant, the charging current varies inversely with the charging time. Thus, if the charging current is constant, the charging time can be shortened to 1/n.

On the other hand, during the voltage monitoring operation, the capacitor divided into n capacitors, that is, capacitors C1–C4 are connected in parallel as shown in FIG. 7A. Accordingly, the voltage across each capacitor is leveled, and irregularities in characteristics among the capacitors C1–C4 are absorbed, whereby each capacitor is charged equally.

In other words, when the capacitors C1–C4 are connected in series in the foregoing charging state, if there are irregularities in the characteristics, for example, leaking current characteristics, etc., among the capacitors C1–C4, a voltage difference may be produced among the capacitors C1–C4. On the contrary, by connecting the capacitors C1–C4 in parallel during the voltage monitoring operation, a voltage difference among the capacitors C1–C4 is absorbed, whereby the voltage in each capacitor is leveled to the same voltage. By conducting the voltage monitoring operation and charging operation in alternation at predetermined timing, each capacitor can be charged equally even there is a difference in characteristics among the capacitors C1–C4.

During the voltage monitoring operation, each of the capacitors C1–C4 connected in parallel in the capacitor bank 20 is connected to the single voltage monitor circuit 30 at the both ends, so that the charged voltage accumulated in each of the capacitors C1–C4 in the capacitor bank 20 is detected.

When the voltage across the capacitor bank 20 detected by the voltage monitor circuit 30 reaches the reference voltage preset to ensure the withstand voltage of each capacitor, the voltage monitor circuit 30 stops the supply of the charging current by outputting a control signal to the power source circuit, whereupon the charging operation is stopped.

In other words, according to the charging device of the present embodiment, because the capacitors are switched to the parallel connection state during the voltage monitoring operation so that the voltage across each capacitor (charged voltage) can be detected by the single voltage monitor circuit, the voltage monitor circuits connected to the capacitors in parallel in the matching number as discussed in the Related Art column can be omitted. Consequently, the size and cost of the charging device can be reduced markedly.

Figure 19B:
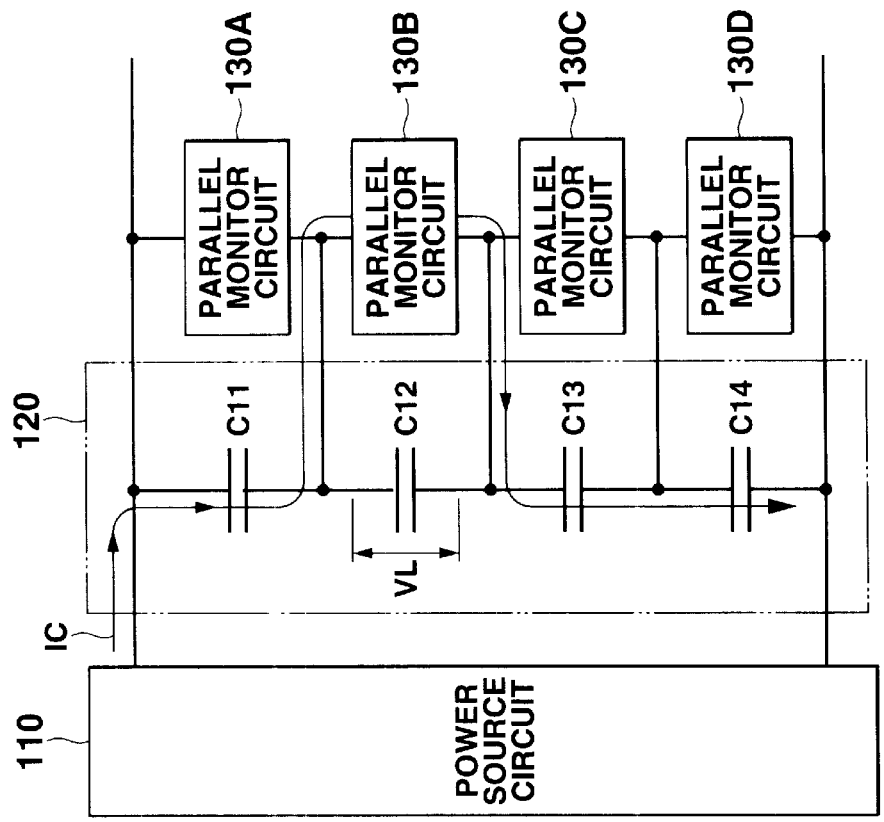
FIGS. 19A and 19B are block diagrams showing a major portion of a conventional arrangement of the charging device.
Figure 19A:
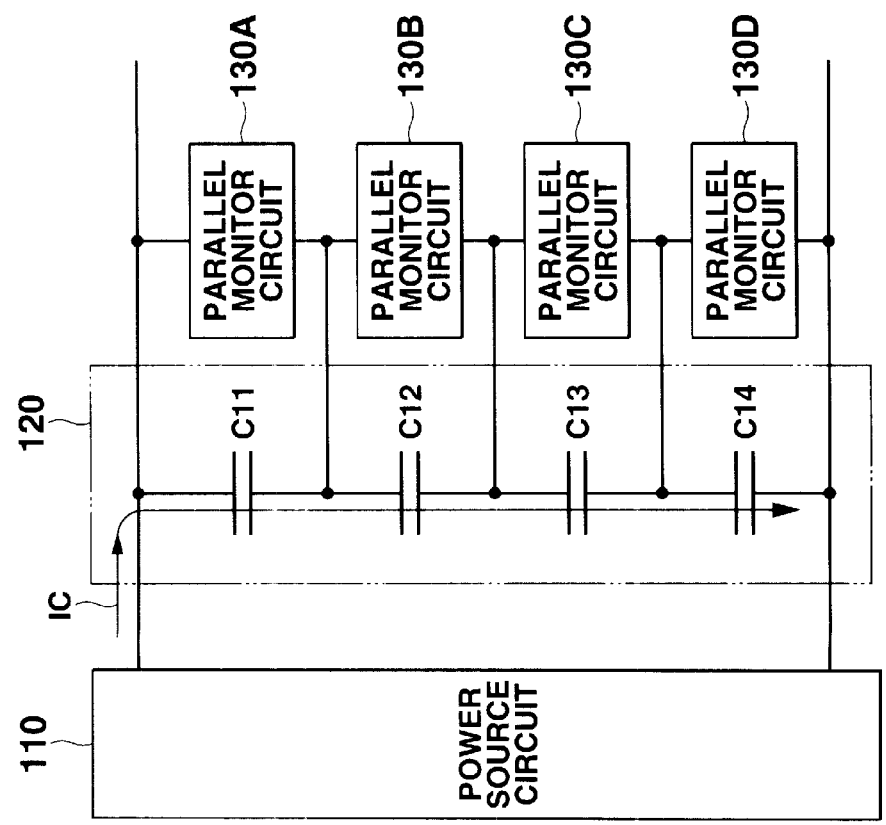

In addition, the voltage monitor circuit employed in the present embodiment is furnished with a function of detecting the voltage charged in the capacitor bank, and outputting a control signal that stops the supply of the charging current when the detected voltage reaches or exceeds the reference voltage. Therefore, the arrangement, realized by the parallel monitor circuits 130A–130D connected to the capacitors in parallel as shown in FIG. 19A and FIG. 19B of the related art to bypass the charging current when the detected voltage value reaches or exceeds the reference voltage, is omitted. Thus, the heat quantity from the voltage monitor circuit of the present embodiment can be reduced significantly compared with the foregoing parallel monitor circuits.

Next, the following description will describe the charging method of the charging device of the present embodiment with reference to the corresponding drawings.

Figure 8:
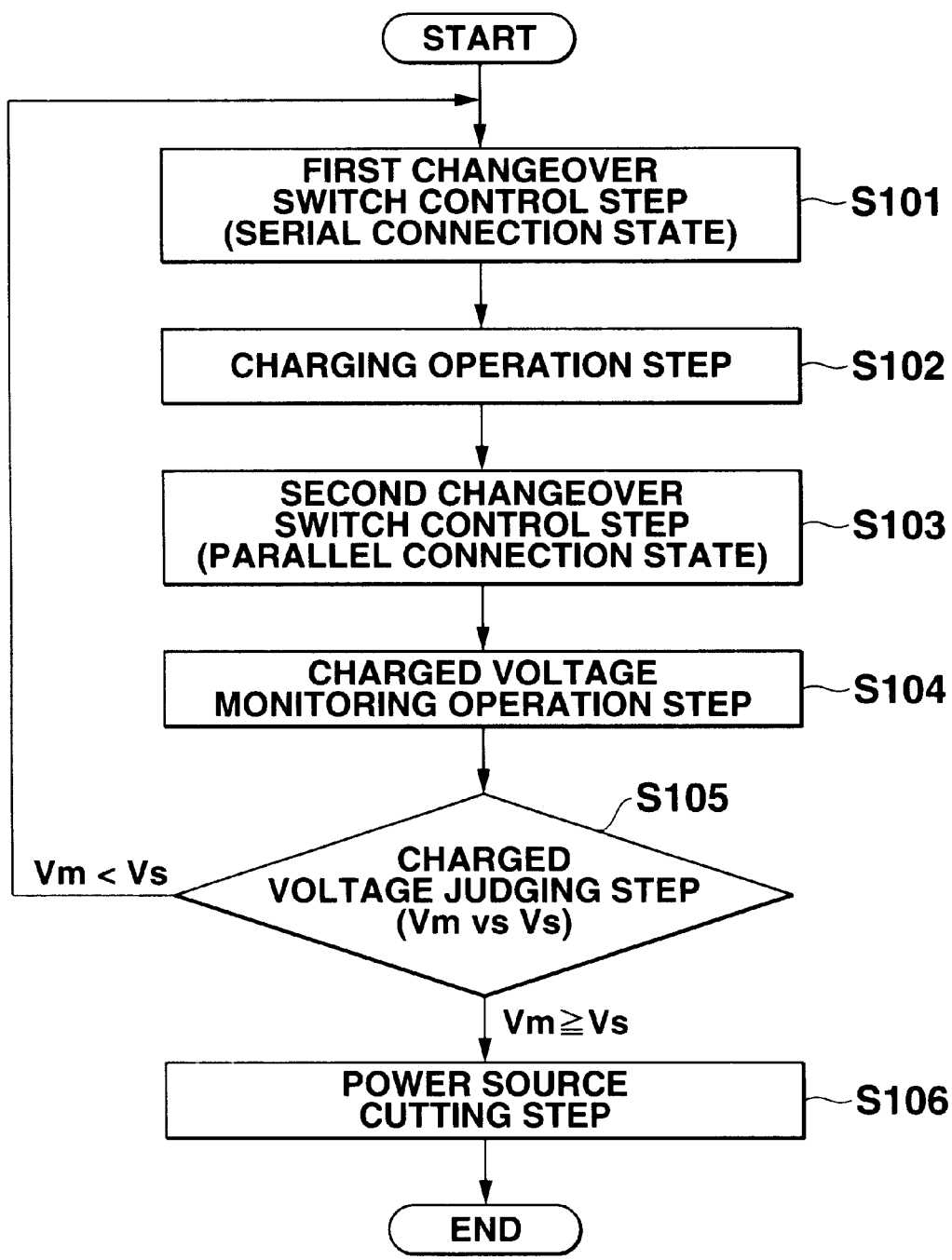
FIG. 8 is a flowchart detailing a procedure of a charging method of the capacitor bank in the charging device of the present invention.

FIG. 8 is a flowchart detailing the procedure of the charging method of the capacitor bank employed in the present embodiment, and FIGS. 9A–9E are the timing charts showing control timing of the capacitors forming the capacitor bank employed in the present embodiment. The arrangement of the charging device shown in FIG. 1 will be referred to from time to time as necessity arises.

In S101 (first changeover switch control step) of FIG. 8, the capacitors C1–C4 are switched to the serial connection state and the capacitor bank 20 is connected to the power source circuit 10 by switching the changeover switches SW0 and SW11–SW13 ON, and the changeover switches SW21–SW23 and SW31–SW33 OFF by the connection control circuit 40.

Then, in S102 (charging operation step) of FIG. 8, the charging operation to charge the capacitors C1–C4 is started by supplying the capacitors C1–C4 with the charging current IA from the power source circuit 10 via the high potential side power source line HL.

Then, in S103 (second changeover switch control step) of FIG. 8, after a predetermined time has passed since the charging operation started, the capacitors C1–C4 are switched to the parallel connection state, while the charging operation is suspended by electrically disconnecting the capacitor bank 20 from the power source circuit 10 and reconnecting the same to the voltage monitor circuit 30 by switching the changeover switches SW0 and SW11–SW13 OFF, and the changeover switches SW21–SW23 and SW31–SW33 ON by the connection control circuit 40.

Then, in S104 (charged voltage monitoring operation step) of FIG. 8, the charged voltage monitoring operation is performed, by which the voltage monitor circuit 30 detects the charged voltage charged in the capacitors C1–C4 as a detected voltage Vm.

Then, in S105 (charged voltage judging step) of FIG. 8, the voltage monitor circuit 30 compares the detected voltage Vm thus detected with the reference voltage (withstand proof voltage) Vs preset based on the withstand voltage of the capacitors C1–C4. When the detected voltage Vm is lower than the reference voltage Vs (Vm<Vs), the flow returns to S101 (first changeover switch control step) of FIG. 8 when the voltage monitoring operation is completed, so that the capacitors C1–C4 are switched to the serial connection state and the capacitor bank 20 is connected to the power source circuit 10 again by switching the changeover switches SW0 and SW11–SW13 ON, and the changeover switches SW21–SW23 and SW31–SW33 OFF.

On the other hand, in S105 (charged voltage judging step) of FIG. 8, when the detected voltage Vm detected by the voltage monitor circuit 30 reaches or exceeds the reference voltage Vs (Vm≧Vs), S106 (power source cutting step) of FIG. 8 is performed to side the charging operation, in which the voltage monitor circuit 30 stops the supply of the charging current from the power source circuit 10 by outputting the control signal SC0 to the same.

Figure 9:
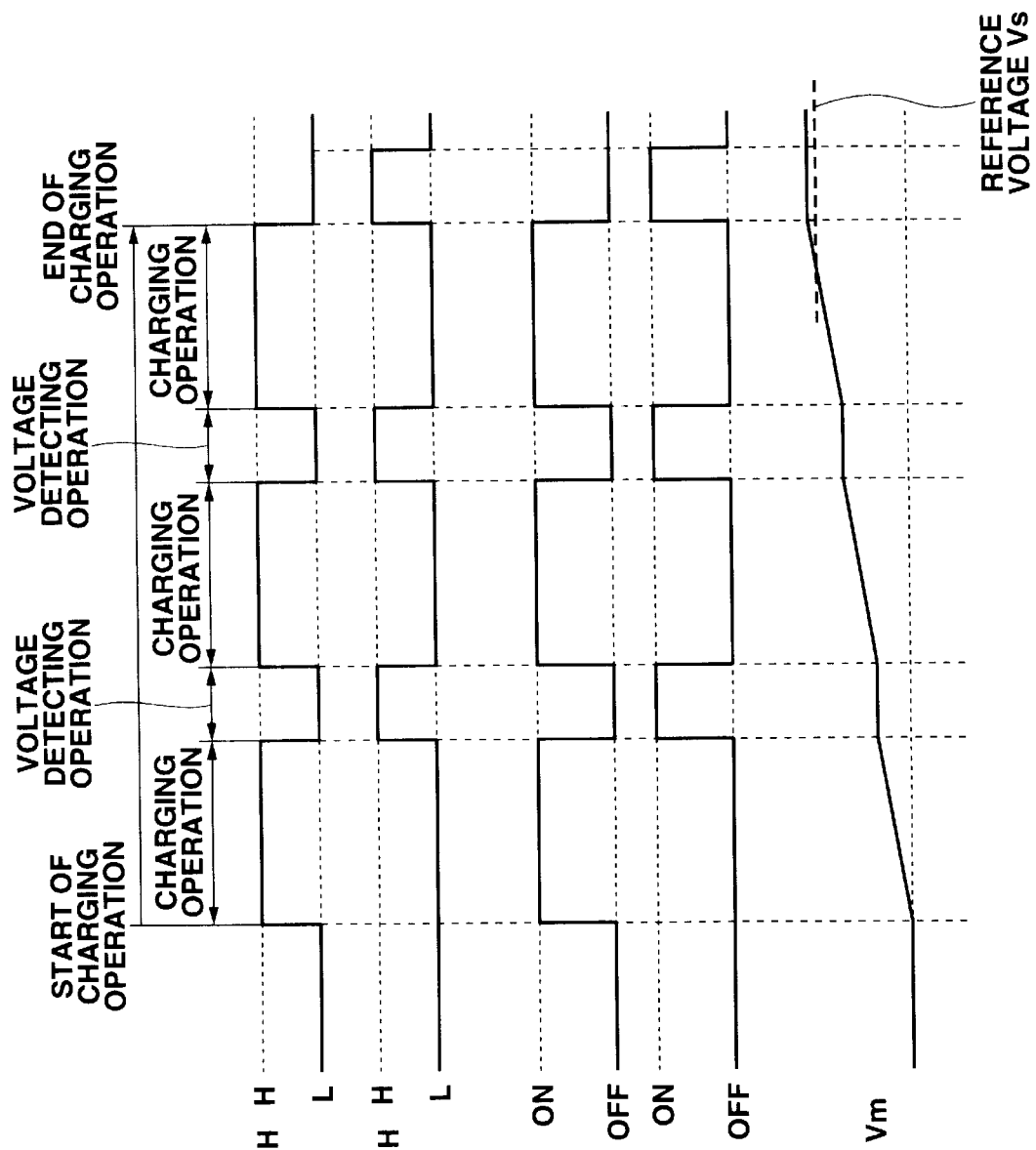
FIGS. 9A to 9E are timing charts showing control timing of capacitors forming the capacitor bank in the charging device of the present invention.

FIGS. 9A to 9F show the timing charts of the operations involved in the foregoing charging method of the present embodiment. More specifically, by using the control signals shown in FIGS. 9A and 9B, the changeover switches SW0 and SW11–SW13, and the changeover switches SW21–SW23 and SW31–SW33 are collectively switched ON or OFF at the opposite timing as shown in FIGS. 9C and 9D, respectively. Accordingly, the changeover switches SW0 and SW11–SW13 are switched ON and the capacitors C1–C4 are connected in series, whereupon the charging operation is started.

Consequently, as shown in FIG. 9E, the charged voltage in the capacitor increases in proportion to the charging time during the charging operation period based on Equation (3) above.

In addition, the voltage monitoring operation is started when the capacitors C1–C4 are reconnected in parallel as the changeover switches SW0 and SW11–SW13 are switched OFF and the changeover switches SW21–SW23 and SW31–SW33 are switched ON at predetermined time intervals. The charging operation and voltage monitoring operation are performed repetitively at predetermined time intervals. As shown in FIG. 9E, the detected voltage Vm increases with the increasing charged voltage as the charging proceeds, and is compared with the reference voltage Vs from time to time. When the detected voltage Vm reaches or exceeds the reference voltage Vs, the charging operation is completed. Although it will be discussed in detail below, the intervals between the charging operations and voltage monitoring operations may be constant or adjusted from time to time as necessity arises.

Next, the following description will describe one embodiment of changeover switch control means and a concrete example arrangement of the changeover switches in the capacitor bank employed in the charging device of the present embodiment with reference to the corresponding drawings.

Figure 10:
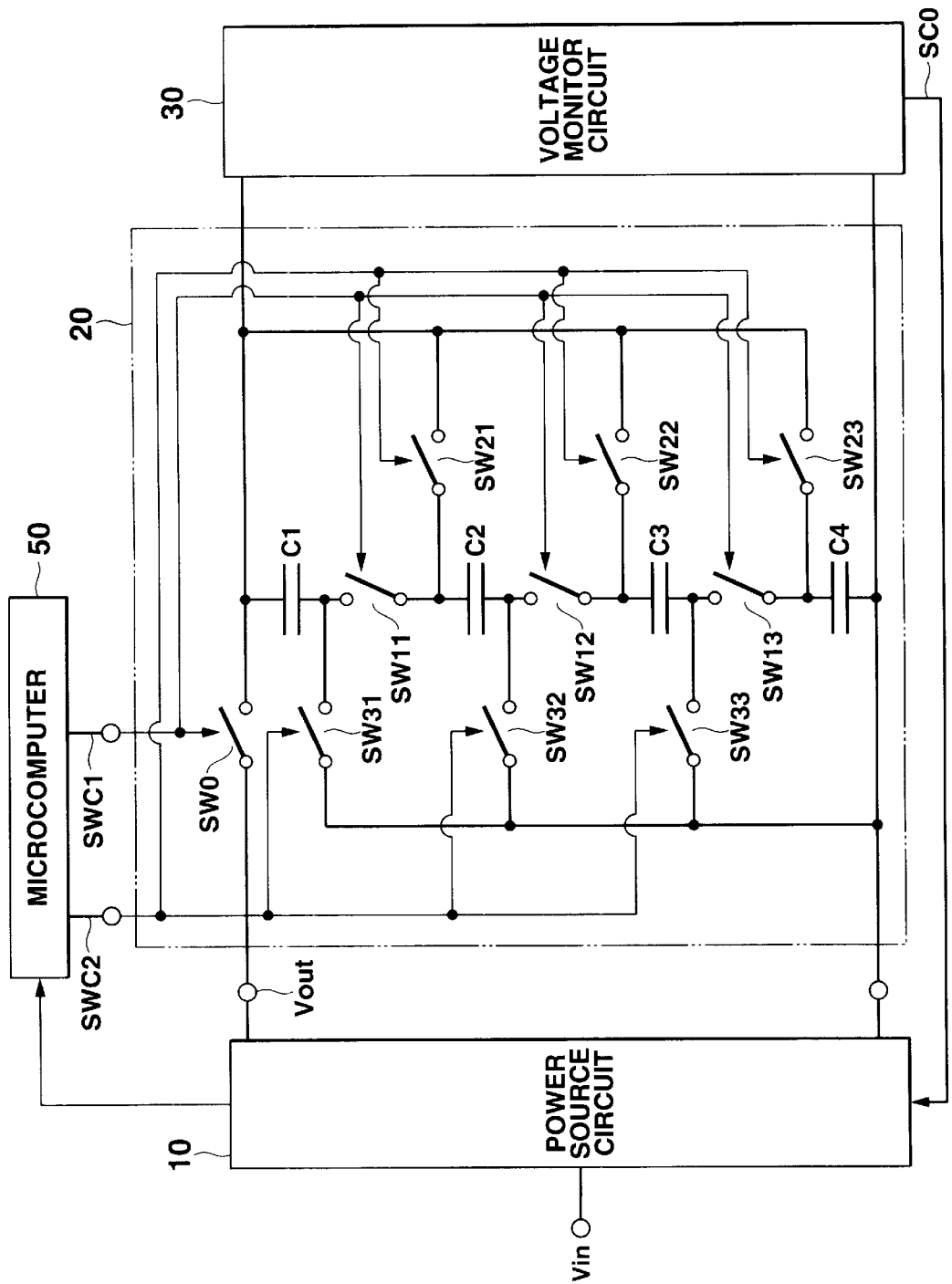
FIG. 10 is a circuit block diagram showing a first example of connection control means in the capacitor bank in the charging device of the embodiment.

FIG. 10 is a circuit block diagram showing a first embodiment of the connection control circuit. As shown in FIG. 10, the control means comprises a microcomputer 50, which controls the ON/OFF action of a group of the changeover switches SW0 and SW11–SW13 collectively by the control signal SWC1, and the ON/OFF action of the group of the changeover switches W21–SW23 and SW31–SW33 collectively by the control signal SWC2.

The output timing of the control signals SWC1 and SWC2 may correspond to the procedure of the charging method, by which the charging operation and voltage monitoring operation are repeated at regular time intervals. Alternatively, for example, based on the fact that the charged voltage in the capacitors increases in proportion to the charging time, a necessary time for the charged voltage to reach the reference voltage is computed and the voltage monitoring operation may be started when it is detected that the necessary time has passed since the charging operation started. In the latter case, the charging time can be shortened further and the charging efficiency can be improved further compared with the case where the charging operation and voltage monitoring operation are repeated at regular time intervals.

Figure 11:
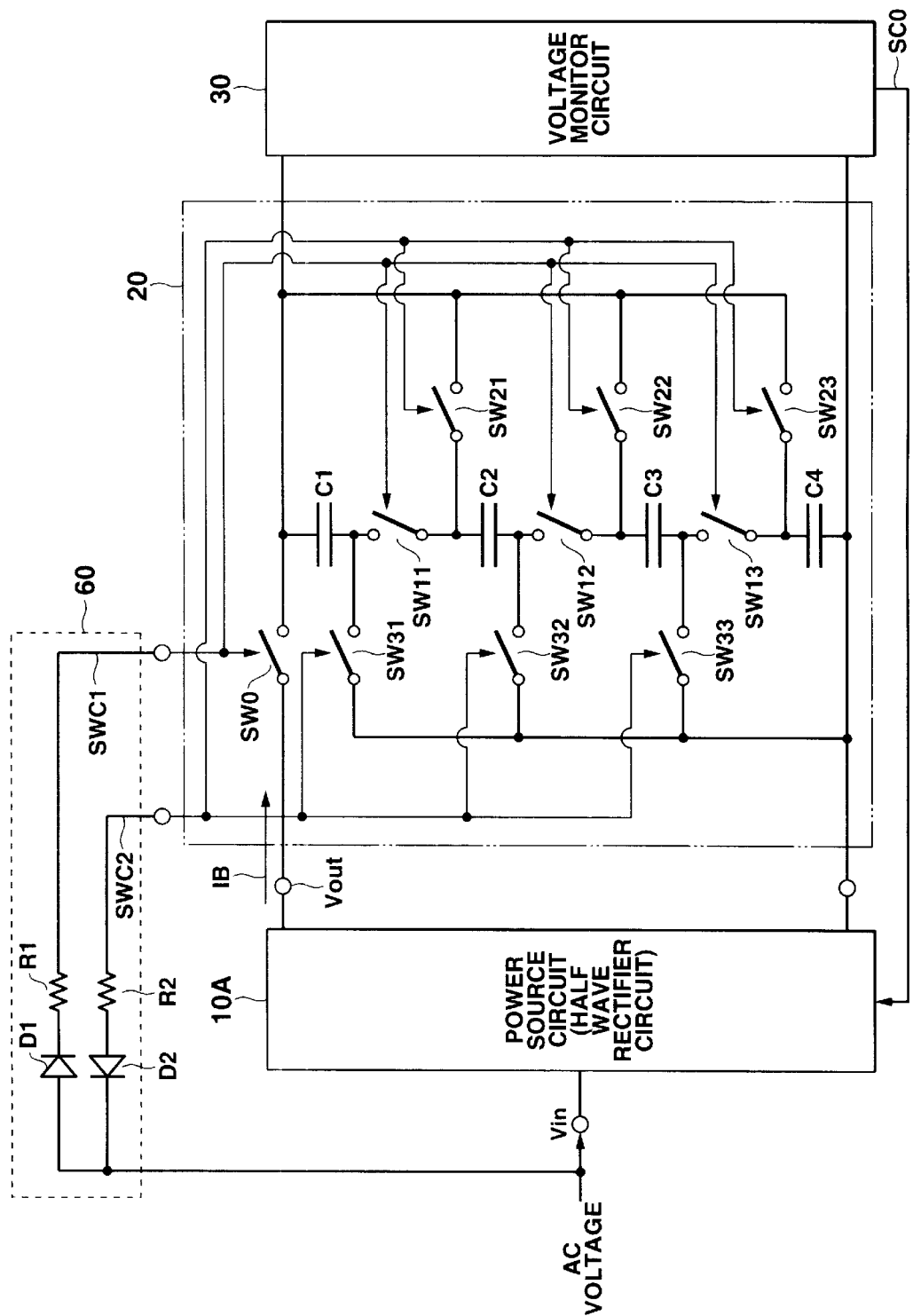
FIG. 11 is a circuit block diagram showing a second example of connection control means in the capacitor bank in the charging device of the embodiment.

FIG. 11 is a circuit block diagram showing a second embodiment of the connection control circuit. As shown in FIG. 11, the control means comprises a first signal system for outputting the voltage waveform generated by allowing an AC voltage supplied from the commercial AC power source to pass through a diode D1 and a protecting resistor R1 as the first control signal SWC1, and a second signal system for outputting the voltage waveform generated by allowing the AC voltage to pass through a diode D2 and a protecting resistor R2 as the second control signal SWC2. In the present embodiment, a power source circuit 10A is composed of a half wave rectifier circuit which generates a pulsating flow by rectifying the AC voltage supplied from the commercial AC power source into a half wave signal and supplies the same to the capacitor bank 20.

Figure 12:
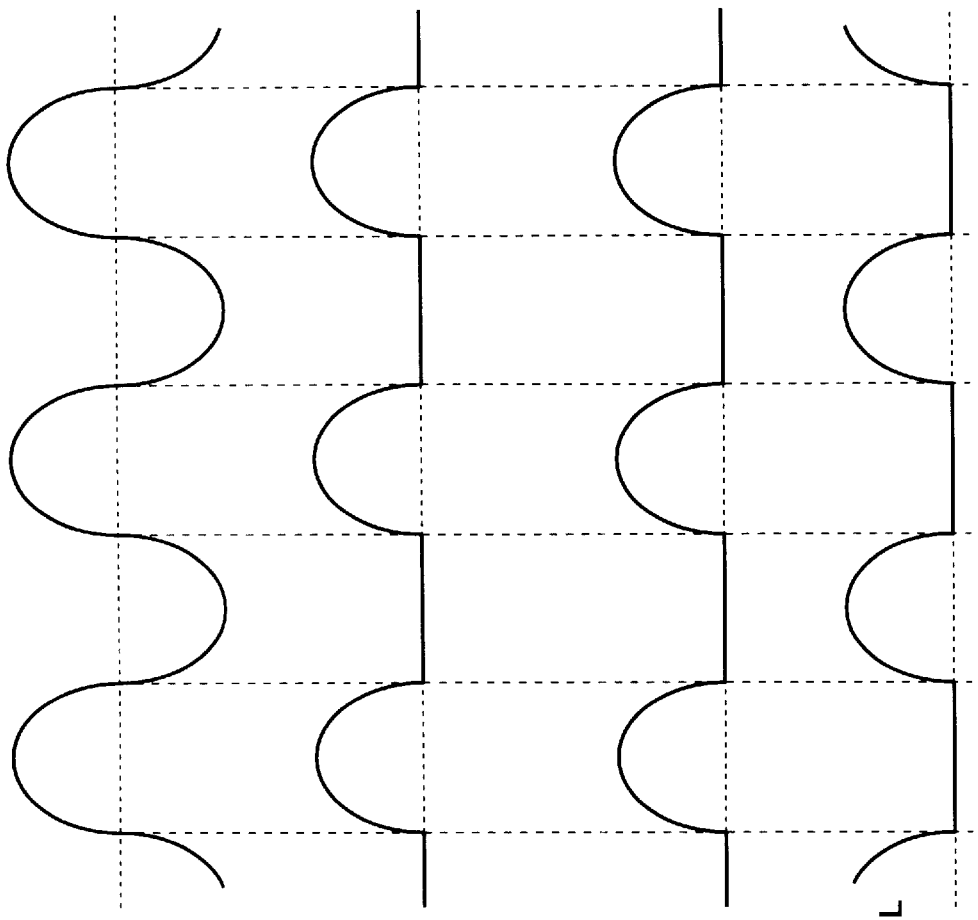
FIGS. 12A to 12D are waveform charts showing signal waveforms of a charging current and first and second control signals in the second example of the connection control circuit.

FIG. 12A and FIG. 12B are waveform charts showing changes in the signal waveforms by half wave rectification of the half wave rectifier circuit. In other words, the positive signal voltage component alone is extracted from the AC voltage supplied from the commercial AC power source shown in FIG. 12A, and a pulsating flow having cyclic positive voltage waveforms as shown in FIG. 12B is generated, which is supplied to the capacitor bank 20 as the charging current.

FIG. 12C and FIG. 12D are waveform charts showing the signal waveforms of the first control signal SWC1 and second control signal SWC2.

In other words, the first control signal SWC1 is generated as a signal having cyclic positive voltage waveforms as shown in FIG. 12C by allowing only the positive voltage component in the AC voltage supplied from the commercial AC power source shown in FIG. 12A to pass through the diode DI which is connected in the forward direction with respect to the AC voltage. The control signal SWC1 thus generated is supplied to the capacitor bank 20 as a signal that connects the capacitors in series by controlling the ON/OFF action of the changeover switches SW0 and SW11–SW13.

On the other hand, the second control signal SWC2 is generated as a signal having cyclic positive voltage waveforms as shown in FIG. 12D by allowing only the negative voltage component in the AC voltage to pass through the diode D2 which is connected in the inverse direction with respect to the AC voltage. The control signal SWC2 thus generated is supplied to the capacitor bank 20 as a signal that connects the capacitors in parallel by controlling the ON/OFF action of the switches SW21–SW23 and SW31–SW33.

In other words, the control signal SWC1 is in sync with the pulsating flow shown in FIG. 12B which is supplied to the capacitor bank 20 as the charging current, and switches the capacitors C1–C4 to the serial connection state by controlling the changeover switches SW0 and SW11–SW13 to be switched ON collectively, and the charging current based on the pulsating current is supplied to the capacitor bank 20, whereupon the charging operation is started.

On the contrary, the control signal SWC2 has the opposite timing to the pulsating flow shown in FIG. 12B which is supplied to the capacitor bank 20 as the charging current, and switches the capacitors C1–C4 to the parallel connection state by controlling the changeover switches SW21–SW23 and SW31–SW33 to be switched ON collectively. Accordingly, the supply of the charging current to the capacitor bank 20 is stopped and the charging operation is suspended, while the capacitor bank 20 is reconnected to the voltage monitor circuit 30, whereupon the voltage monitoring operation by the voltage monitor circuit 30 is started.

In this manner, in the present embodiment, the arrangement is provided such that the AC voltage supplied from the commercial AC power source is used in supplying the charging current and controlling the switching of the changeover switches. Accordingly, it becomes possible to perform the charging operation and voltage monitoring operation repetitively by switching the capacitors from the serial connection state to the parallel connection state and vice versa periodically in sync with the commercial AC power source, and therefore, the charging operation for the capacitor bank can be performed in a satisfactory manner by using a simple arrangement.

Figure 13:
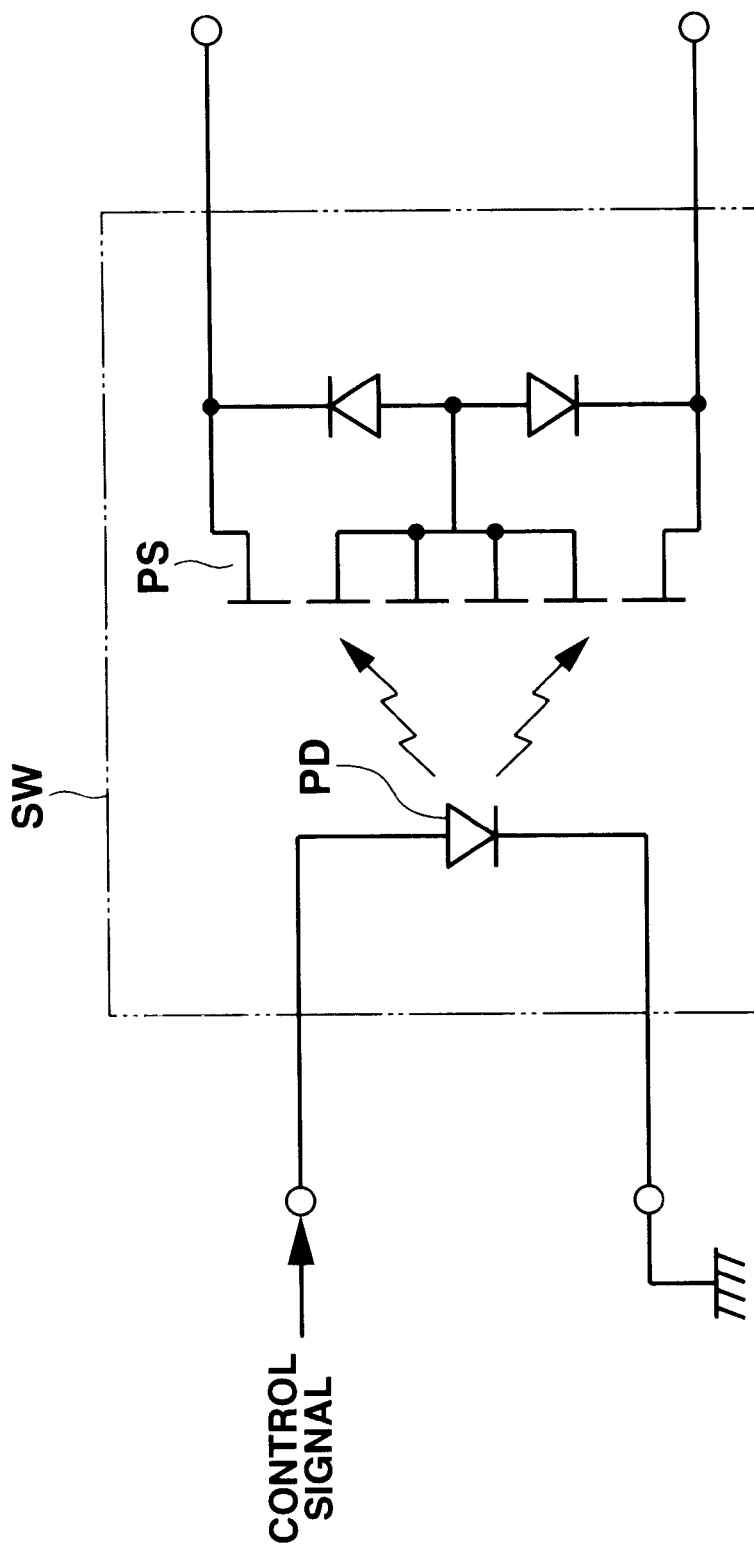
FIG. 13 is a circuit diagram showing an example of a changeover switch in the capacitor bank in the charging device in accordance with the embodiment of the present invention.

FIG. 13 is a circuit diagram showing a concrete example arrangement of the changeover switch in the capacitor banks 20. The changeover switch comprises a so-called photocoupler (optically coupled transistor) composed of a photodiode PD for emitting light of a predetermined wavelength in accordance with a predetermined voltage signal used as a switch control signal, and a phototransistor PS for electrically conducting upon receipt of light from the photodiode PD. According to the changeover switch having the foregoing arrangement, not only can the input side (control signal) be electrically isolated from the output side (switching operation), but also the ON/OFF action can be realized in an exact correspondence with the control signal.

Figure 14:
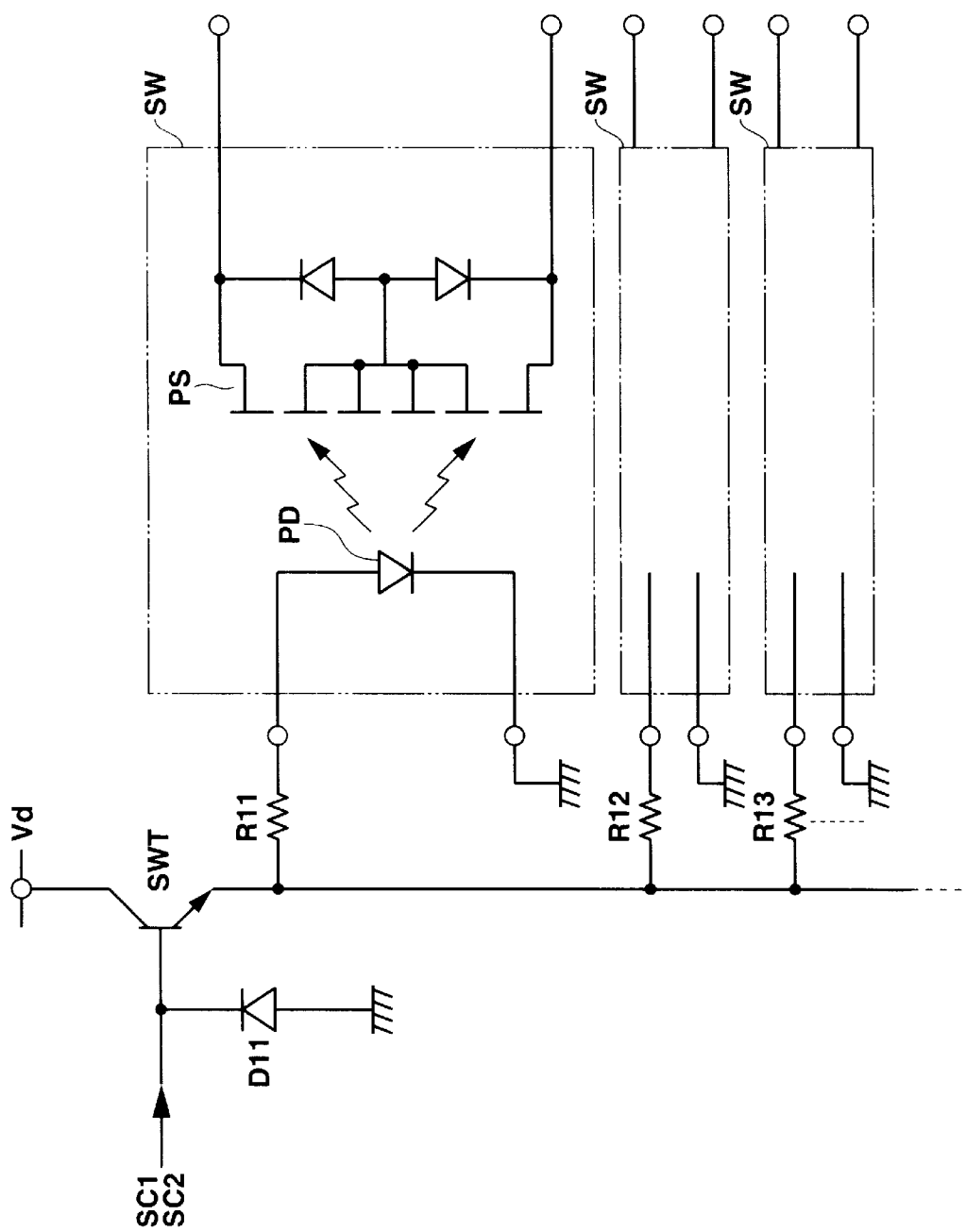
FIG. 14 is a circuit diagram showing a major portion when the changeover switch of FIG. 13 is adapted to the second example of the switch control means.

FIG. 14 is a circuit diagram showing a major portion when the arrangement shown in FIG. 13 is adapted to the changeover switch controlled by the first control signal SWC1 and second control signal SWC2 in the charging device shown in FIG. 11. In other words, the control circuit for supplying the control signals SWC1 and SWC2 to the changeover switch comprises a switching transistor SWT using the control signal SWC1 or SWC2 as a base input with its collector being connected to a power source Vd, and an overvoltage preventing diode D11 connected to a base input line (input lines of the control signals SWC1 and SWC2) for preventing an overvoltage from being applied to the switching transistor SWT, and the changeover switches SW each composed of the photocoupler shown in FIG. 13 are connected in parallel to the emitter terminal of the switching transistor SWT through their respective photodiode current limiting resistors R11, R12, R13, . . . .

The foregoing changeover switches are collectively switched ON under control when the switching transistor SWT conducts upon application of a predetermined signal voltage to the base input thereof by the control signal SWC1 and SWC2, and a predetermined emitter current flows into each of the changeover switches SW through their respective photodiode current limiting resistors R11, R12, R13, . . . in response to the power source Vd applied to the collector.

The foregoing embodiments described a case in which the changeover switches are controlled by the microcomputer used as the switch control means, and a case in which the changeover switches are controlled in sync with the commercial AC voltage. However, the charging device of the present invention is not limited to these embodiments, and for instance, the timing of the control signal generated based on the pulsating flow generated from the commercial AC power source may be changed under the control of the microcomputer or the like and outputted to the changeover switches. In this case, a duty ratio of the control signal that switches the connection state of the capacitors can be changed as desired, thereby making it possible to provide a charging device which realizes a faster charging operation and a further reduction of the charging current.

Next, the following description will describe the arrangement of the power source circuit employed in the charging device of the present embodiment with reference to the corresponding drawings.

Figure 15A:
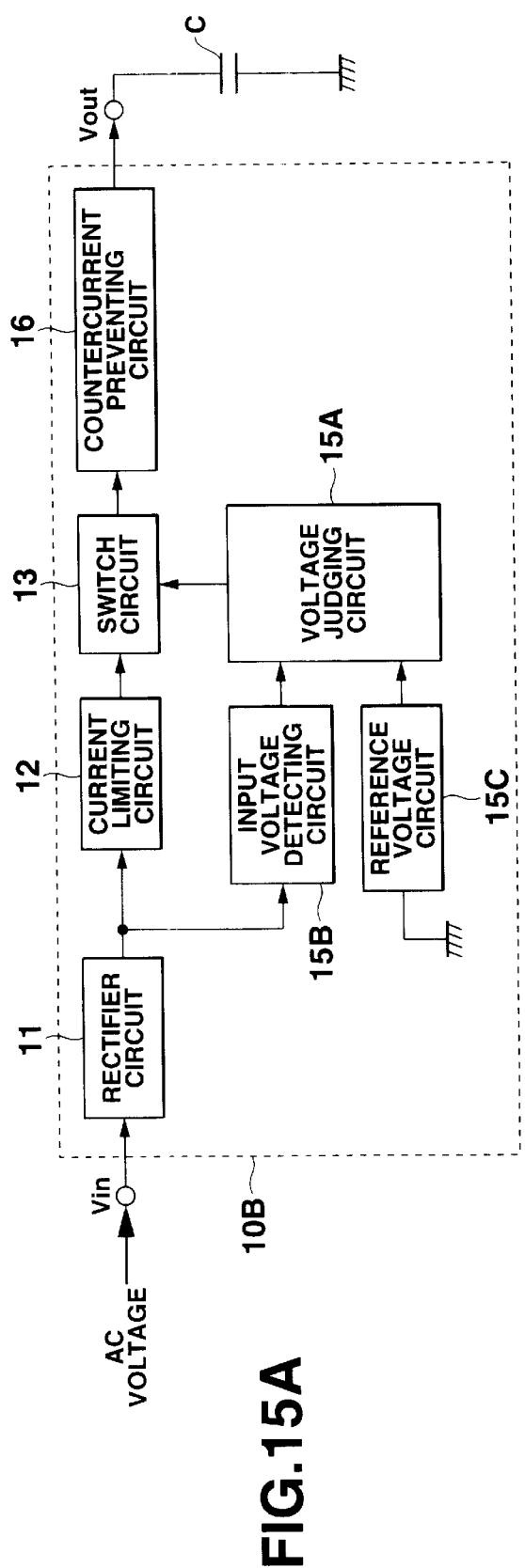
FIGS. 15A and 15B are a block diagram and a circuit diagram showing a first embodiment of a power source circuit in the charging device of the present invention.

FIG. 15A is a block diagram showing an arrangement of a first embodiment of the power source circuit 10 employed in the charging device of the present embodiment.

As shown in FIG. 15A, a power source circuit 10B of the present embodiment comprises a rectifier circuit 11, a current limiting circuit 12, an input voltage detecting circuit 15B, a switch circuit 13, a voltage judging circuit 15A, and a countercurrent preventing circuit 16, and an AC voltage is supplied to an input terminal Vin of the power source circuit 10B from a commercial power source. In the charging device of the present embodiment, the power source circuit is connected to the load from the capacitor bank as previously mentioned, but the explanation is given in the first example and a second example described below on the assumption that an output terminal Vout of the power source circuit 10B is connected to the single capacitor C for ease of explanation.

The rectifier circuit 11 generates a pulsating flow having a predetermined voltage cycle by rectifying an input AC voltage into a half wave or full wave signal. The voltage judging circuit 15A compares a change in voltage on the pulsating flow detected by the input voltage detecting circuit 15B with the preset reference voltage, and controls the conducting state of the switch circuit 13 based on the large-and-small relation thereof. The countercurrent preventing circuit 16 prevents the electric energy accumulated in the capacitor C from flowing inversely when the voltage on the pulsating flow at the switch circuit 13 side is lower than the charged voltage in the capacitor C.

According to the power source circuit having the foregoing arrangement, the control is effected in such a manner that the charging current is supplied to the electrical double layer capacitor C only for a period during which a change in voltage on the pulsating flow based on the input AC voltage is in a voltage range not exceeding the reference voltage. In other words, the power source circuit is arranged such that the largest voltage during the charging operation is limited, and the charging current is supplied periodically.

Figure 15B:
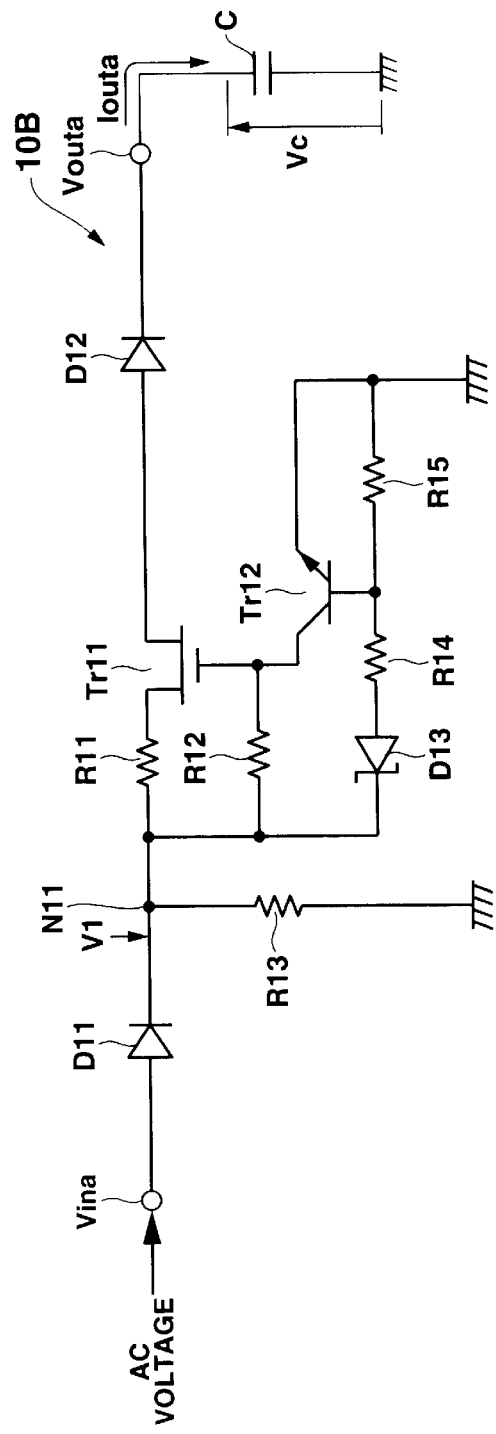

FIG. 15B is a circuit diagram showing a concrete example of the power source circuit 10B of the present embodiment. An AC voltage from the commercial power source is connected to the input terminal Vina of the power source circuit 10B, and the capacitor C is connected to the output terminal Vouta thereof.

A half wave rectifying diode D11, a current limiting resistor R11, a switching field effect transistor (hereinafter, simply referred to as the switch) Tr11, and a countercurrent preventing diode D12 are connected in series between the input terminal Vina and output terminal Vouta.

A voltage detecting resistor R12 is provided between the contact point N11 of the half wave rectifying diode D11 and the current limiting resistor R11 and the gate of the switch Tr11, and a resistor R13 is provided between the contact point N11 and the earth. A switch control transistor (hereinafter, referred to simply as the control switch) Tr12 is provided between the gate of the switch Tr11 and the earth with its collector and emitter being connected to the gate of the switch Tr11 and the earth, respectively. A Zener diode D13 and a dividing resistor R14 are provided between the base of the control switch Tr12 and the contact point N11, and a dividing resistor R15 is provided between the base of the control switch Tr12 and the earth. The voltage detecting resistor R12 forms the input voltage detecting circuit, and the Zener diode D13, dividing resistors R14 and R15, and control switch Tr12 form the voltage judging circuit and a reference voltage circuit.

FIG. 16A to FIG. 16D are waveform charts showing voltage and current waveforms representing the operations of the power source circuit of the present example.

In the foregoing circuit arrangement, in case that a sine AC voltage of AC 100V as shown in FIG. 16A is applied to the input terminal Vina as the AC voltage, for example, the positive voltage component alone is extracted by rectification of the half wave rectifying diode D11, and as shown in FIG. 16B, a pulsating flow V1 having positive voltage waveforms in sync with the cycle of the commercial power source voltage is generated.

Then, as shown in FIG. 16C, in a period during which the voltage V1 is lower than the reference voltage $V_0$ set based on the Zener voltage Vz of the dividing resistors R14 and R15 and Zener diode D13, the voltage V1 is applied to the gate of the switch Tr11 by the voltage detecting resistor R13 because the control switch Tr12 is in the non-conducting (OFF) state, whereupon the switch Tr11 is switched to the conducting (ON) state. Thus, as shown in FIG. 16D, a charging current Iouta is supplied to the capacitor C through the current limiting resistor R11, switch Tr11, and countercurrent preventing diode D12, whereupon the charging operation is started.

As the time elapses, the above period shifts to a period during which the voltage V1 becomes higher than the reference voltage $V_0$. Then, a countercurrent starts to flow through the Zener diode D13, and a voltage divided by the dividing resistors R14 and R15 is applied as the base voltage of the control switch Tr12. When this voltage exceeds a base-emitter voltage Vbe in the control switch Tr12, the control switch Tr12 is switched to the conducting (ON) state, and the voltage applied to the gate of the switch Tr11 by the voltage detecting resistor R12 drops to almost 0V, whereupon the switch Tr11 is switched to the non-conducting (OFF) state.

In other words, the voltage Vouta applied to the capacitor C is the pulsating flow voltage V1 in a voltage range of a short period from the earth voltage (GND) to the reference voltage $V_0$ based on the Zener voltage of the dividing resistors R14 and R15 and Zener diode D13, which is supplied for every cycle of the input AC voltage with its largest voltage being limited.

As shown in FIG. 16D, let Vc be the voltage across the capacitor C, then the charging current Iouta flows into the electrical double layer capacitor C by a potential difference between the applied voltage Vouta to the capacitor C and Vc. Because Vc increases as the charging proceeds, the charging current decreases as the charging proceeds and drops to zero when Vc reaches the reference voltage Vz. In other words, the charging current Iouta is allowed to flow in short periods including the rising period (t11–t12) and falling period (t13–t14) of the voltage waveform shown in FIG. 16D.

As has been discussed, according to the above embodiment of the power source circuit, when the capacitor is charged by using the AC voltage from the commercial power source, it becomes unnecessary to step down the voltage by a transformer or the like. Consequently, the circuit arrangement of the charging circuit can be simplified markedly. Also, because it is controlled such that the charging current is supplied periodically for a short period based on the cycle of the AC voltage as has been discussed, even if a large current is supplied, heat generation from the circuit element can be suppressed, and the size, weight, and cost of the charging device can be reduced significantly. In addition, the circuit arrangement can be simplified by omitting an oscillation circuit, such as an inverter, and an additional power source for control, while ensuring the stability of the circuit operation.

Figure 17A:
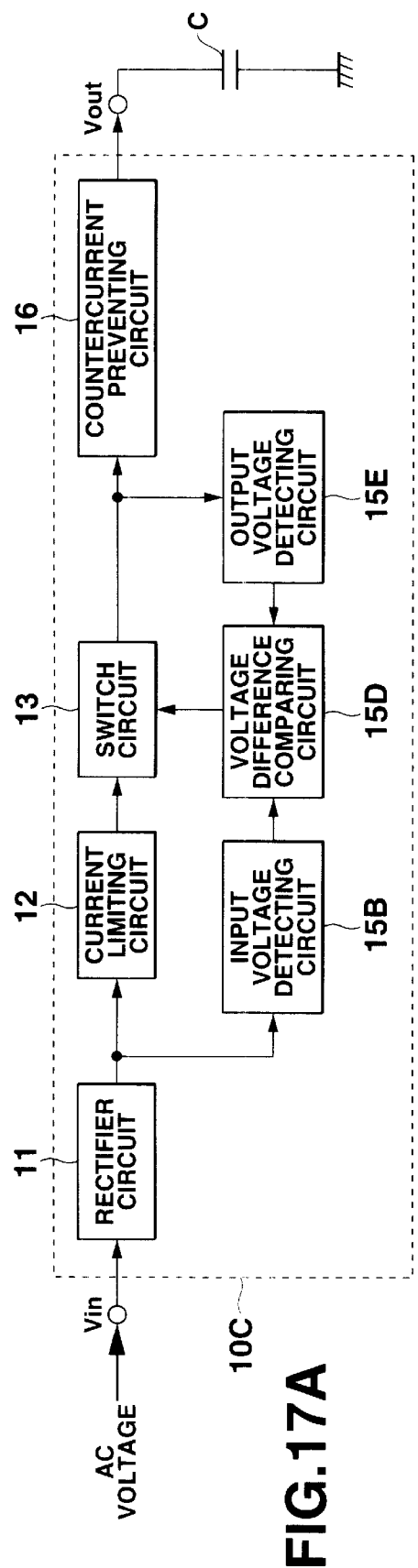
FIGS. 17A and 17B are a block diagram and a circuit diagram representing a second embodiment of the power source circuit in the charging device of the present invention.

FIG. 17A is a block diagram showing a power source circuit 10C as a second embodiment employed as the power source circuit of the present invention. Like members are designated by like reference characters with respect to the first example shown in FIG. 15A, and the explanation of these members is omitted for ease of explanation.

As shown in FIG. 17A, the power source circuit 10C of the present embodiment comprises a rectifier circuit 11, a current limiting circuit 12, an input voltage detecting circuit 15B, a switch circuit 13, a voltage difference comparing and judging circuit 15D, an output voltage detecting circuit 15E, and a countercurrent preventing circuit 16, and an AC voltage is supplied to an input terminal Vin of the power source circuit 10C from a commercial power source and the capacitor C is connected to an output terminal Vout thereof.

The voltage difference comparing and judging circuit 15D compares a voltage on the pulsating flow generated by the rectifier circuit 11 and detected by the input voltage detecting circuit 15B with an output voltage Vout detected by the output voltage detecting circuit 15E, and controls the conducting state of the switch circuit 13 based on the large-and-small relation thereof.

Thus, according to the power source circuit having the foregoing arrangement, the control is effect in such a manner that the charging current based on the pulsating flow generated by the rectifier circuit 11 is supplied to the capacitor C by switching the switch circuit 13 to the conducting state only for a period during which a voltage difference between the input voltage Vin and output voltage Vout is in a predetermined voltage range defined by the voltage difference comparing and judging circuit 15D. In other words, the conduction of the switch circuit 13 is controlled in response to the supplying state of the charging current to the capacitor C, and the charging current is supplied periodically (intermittently) in an adequate manner.

Figure 17B:
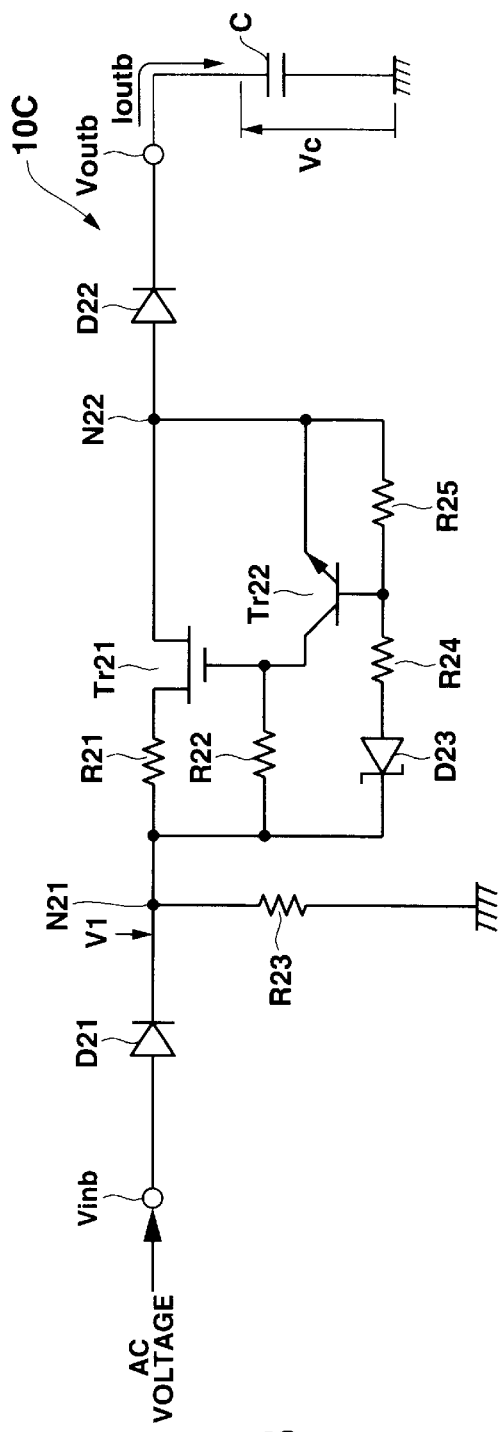

FIG. 17B is a circuit diagram showing a concrete example of the power source circuit of the present embodiment. An AC voltage from the commercial power source is supplied to an input terminal Vinb of the power source circuit 10C, and the capacitor C is connected to an output terminal Voutb thereof.

A half wave rectifying diode D21, a current limiting resistor R21, a switch Tr21, and a countercurrent preventing diode D22 are connected in series between the input terminal Vinb and output terminal Voutb.

A voltage detecting resistor R22 is provided between the contact point N21 of the half wave rectifying diode D21 and current limiting resistor R21 and the gate of the switch Tr21, and a resistor R23 is provided between the contact point N21 and the earth. A control switch Tr22 is provided between the contact point N22 of the switch Tr21 and countercurrent preventing diode D22 and the gate of the switch Tr21 with its emitter and collector being connected to the contact point N22 and the gate of the switch Tr21, respectively. A Zener diode D23 and a dividing resistor R24 are provided between the base of the control switch Tr22 and the contact point N21, and a dividing resistor R25 is provided between the base of the control switch Tr22 and the contact point N22. The voltage detecting resistor R22 forms the voltage detecting circuit, and the Zener diode D23, dividing resistors R25 and R26, and control switch Tr22 form the voltage difference comparing and judging circuit and output voltage detecting circuit.

FIG. 18A to FIG. 18D are waveform charts showing voltage and current waveforms representing the operations of the power source circuit of the present example.

In the foregoing circuit arrangement, in case that a sine AC current of AC 100V as shown in FIG. 18A is applied to the input terminal Vinb as the AC voltage, for example, the positive voltage component period alone is extracted by rectification of the half wave rectifying diode D21, and as shown in FIG. 18B, a pulsating flow V1 having the positive voltage waveforms in sync with the cycle of the commercial power source voltage is provided.

As shown in FIG. 18C, when the voltage V1 is higher than the terminal voltage Vc of the capacitor C, the voltage V1 is applied to the gate of the switch Tr21 by the voltage detecting resistor R22. Thus, the switch Tr21 is switched to the conducting (ON) state, and as shown in FIG. 18D, the charging current is supplied to an electrical double layer capacitor 70A through the current limiting resistor R21, switch Tr21, and countercurrent preventing diode D22, whereupon the charging operation is started.

As the time elapses, the above period shifts to a period during which the voltage V1 becomes higher than the sum of the Zener voltage Vz of the Zener diode D23 and the terminal voltage Vc of the capacitor C. Then, a current starts to flow through the Zener diode D23, and a voltage divided by the dividing resistors R24 and R25 is applied as the base voltage of the control switch Tr22. When this voltage exceeds a base-emitter voltage Vbe in the control switch Tr22, the control switch Tr22 is switched to the conducting (ON) state, and the voltage applied to the gate of the switch Tr21 by the voltage detecting resistor R22 drops almost to 0V, whereupon the switch Tr21 is switched to the non-conducting (OFF) state.

In other words, the charging current Ioutb is allowed to flow only for a voltage period during which the pulsating voltage V1 is in a range from the voltage Vc across the capacitor C to the sum of the voltage Vc across the capacitor C and the Zener voltage Vz of the Zener diode D23 (Vz+Vc). Thus, the charging current Ioutb is allowed to flow for only a short period including the rising period (t31–t32) and the falling period (t33–t34) of the voltage waveforms shown in FIG. 18D.

Thus, according to the power source circuit of the present embodiment, as is with the first embodiment above, the circuit arrangement of the charging circuit can be simplified, and thereby reducing the size, weight, and cost thereof significantly, while ensuring the operation stability. In addition, the control is effected in such a manner that the charging current is maintained substantially at a constant level by increasing a voltage applied to the capacitor C with the charging state of the capacitor C, that is, an increase of the voltage Vc across the capacitor C as the charging proceeds, thereby realizing a more efficient charging operation.

In the circuit diagrams shown in FIG. 15B and FIG. 17B, the field effect transistors (FETs) are used as the switches Tr11 and Tr21 that control the supply of the charging current. However, the present embodiment is not limited to the foregoing arrangement, and a thyristor can be used as well. In this case, there can be offered effects that operation efficiency is improved, the size and weight can be reduced, and the life is extended in comparison with a case using the FETs.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A charging device comprising:
   a capacitor bank having a plurality of capacitors and connection switching means for switching a connection state of, said plurality of capacitors;
   power source means for supplying said plurality of capacitors with a predetermined charging current;
   voltage monitoring means for detecting and monitoring a voltage charged to said plurality of capacitors; and
   connection control means for controlling said connection switching means in said capacitor bank such that, during a charging operation for charging said plurality of capacitors, said plurality of capacitors are connected in series and to said power source means, thereby charging said plurality of capacitors by supplying the predetermined charging current, and during a voltage monitoring operation for detecting and monitoring the voltage charged in said plurality of capacitors, said plurality of capacitors are connected in parallel and disconnected from said power source means, thereby detecting and monitoring a charged voltage in said plurality of capacitors by using said voltage monitoring means;
   wherein said voltage monitoring means compares a charged voltage detected during said voltage monitoring operation with a preset reference voltage, and stops supply of said charging current to said plurality of capacitors from said power source means when said charged voltage reaches or exceeds said reference voltage.

2. A charging device comprising:
   a capacitor bank having a plurality of capacitors and connection switching means for switching a connection state of said plurality of capacitors;
   power source means for supplying said plurality of capacitors with a predetermined charging current;
   voltage monitoring means for detecting and monitoring a voltage charged to said plurality of capacitors; and
   connection control means for controlling said connection switching means in said capacitor bank such that, during a charging operation for charging said plurality of capacitors, said plurality of capacitors are connected in series and to said power source means, thereby charging said plurality of capacitors by supplying the predetermined charging current, and during a voltage monitoring operation for detecting and monitoring the voltage charged in said plurality of capacitors, said plurality of capacitors are connected in parallel and disconnected from said power source means, thereby detecting and monitoring a charged voltage in said plurality of capacitors by using said voltage monitoring means;
   wherein said voltage monitoring means is of a single structure connected commonly to said plurality of capacitors connected in parallel during said voltage monitoring operation.

3. The charging device according to claim 2, wherein each of said plurality of capacitors is an electrical double layer capacitor.

4. The charging device according to claim 2, wherein said connection control means in said capacitor bank performs repetitively at predetermined time intervals the charging operation for connecting said plurality of capacitors in series and to said power source means, and the voltage monitoring operation for connecting said plurality of capacitors in parallel and disconnecting said plurality of capacitors from said power source means, thereby detecting and monitoring the voltage charged in said plurality of capacitors by using said voltage monitoring means.

5. The charging device according to claim 2, wherein:
   said connection switching means in said capacitor bank has changeover switches respectively connected to said plurality of capacitors in said capacitor bank; and
   said connection control means connects said plurality of capacitors in series during the charging operation and in parallel during said voltage monitoring operation by controlling said changeover switches.

6. The charging device according to claim 5, wherein said connection control means switches said plurality of capacitors from a serial connection state to a parallel connection state and vice versa by controlling said changeover switches based on a charging state of said plurality of capacitors in said capacitor bank.

7. The charging device according to claim 2, wherein said power source means supplies said charging current based on an AC voltage supplied from a commercial power source.

8. The charging device according to claim 7, wherein said power source means includes:
   rectifying means for generating and outputting a pulsating flow having a predetermined voltage cycle by rectifying said AC voltage; and
   charging control means for comparing an input voltage on said pulsating flow generated by said rectifying means with a preset reference voltage, so that said charging current is supplied when said input voltage is equal to or below said reference voltage.

9. The charging device according to claim 8, wherein said charging control means includes, on a supply path of said charging current:
   current limiting means for limiting a value of said charging current;
   switching means for starting and stopping supply of said charging current; and
   countercurrent preventing means for preventing a current from flowing inversely from said plurality of capacitors, whereby said charging control means compares the input voltage on said pulsating flow generated by said rectifying means with the preset reference voltage, and supplies said charging current when said input voltage is equal to or below said reference voltage by allowing said switching means to conduct.

10. The charging device according to claim 7, wherein:
said power source means includes rectifying means for generating and outputting a pulsating flow having a predetermined voltage cycle by rectifying said AC voltage; and
said power source means detects a difference between an input voltage on said pulsating flow generated by said rectifying means and an output voltage to said plurality of capacitors, and supplies said charging current when said difference is in a predetermined voltage range.

11. The charging device according to claim 10, wherein said charging control means includes, on a supply path of said charging current:
current limiting means for limiting a value of said charging current;
switching means for starting and stopping supply of said charging current; and
countercurrent preventing means for preventing a current from flowing inversely from said plurality of capacitors,
whereby said charging control means detects a difference between the input voltage on said pulsating flow generated by said rectifying means and the output voltage to said plurality of capacitors, and supplies said charging current when said difference is within the predetermined voltage range by allowing said switch means to conduct.

12. The charging device according to claim 7, wherein:
said connection switching means in said capacitor bank includes changeover switches respectively connected to said plurality of capacitors in said capacitor bank; and
said connection control means switches said plurality of capacitors from a serial connection state to a parallel connection state and vice versa by controlling said changeover switches based on a waveform of the AC voltage in said power source means.

13. The charging device according to claim 7, wherein:
said connection switching means in said capacitor bank includes changeover switches respectively connected to said plurality of capacitors in said capacitor bank; and
said connection control means switches said plurality of capacitors from a serial connection state to a parallel connection state and vice versa by controlling said changeover switches based on a waveform of the AC voltage in said power source means and a charging state of said plurality of capacitors.

14. A charging method of a charging device for charging a plurality of capacitors in a capacitor bank by supplying a predetermined charging current, comprising:
a process of connecting said plurality of capacitors in said capacitor bank in series and charging said plurality of capacitors by supplying a charging current from power source means;
a process of reconnecting said plurality of capacitors in parallel at predetermined timing to detect and monitor a charged voltage therein; and
a process of comparing said charged voltage detected with a preset reference voltage to stop supply of the charging current to said plurality of capacitors from said power source means when said charged voltage reaches or exceeds said reference voltage;
wherein said charging current is supplied based on an AC voltage;
wherein said process of supplying said charging current includes:
a process of generating a pulsating flow having a predetermined voltage cycle by rectifying said AC voltage; and
a process of comparing an input voltage on said pulsating flow with a preset reference voltage to supply said charging current when maid input voltage is equal to or below said reference voltage.

15. A charging method of a charging device for charging a plurality of capacitors in a capacitor bank by supplying a predetermined charging current, comprising:
a process of connecting said plurality of capacitors in said capacitor bank in series and to power source means for supplying said plurality of capacitors with a predetermined charging current when a charging operation is performed;
a process of switching said plurality of capacitors to be connected in parallel and disconnected from said power source means when a voltage monitoring operation for detecting and monitoring a charged voltage charged in said plurality of capacitors is performed; and
a process of comparing said detected charged voltage with a preset reference voltage and stopping supply of the charging current to said plurality of capacitors from said power source means when said charged voltage reaches or exceeds said reference voltage.

16. The charging method of a charging device according to claim 15, wherein each of said plurality of capacitors is an electrical double layer capacitor.

17. The charging method of a charging device according to claim 15, wherein:
said capacitor bank includes changeover switches for switching a connection state of said plurality of capacitors;
said process of charging said plurality of capacitors includes a process of connecting said plurality of capacitors in series by controlling said changeover switches; and
said process of detecting and monitoring said charged voltage includes a process of connecting said plurality of capacitors in parallel by controlling said changeover switches.

18. The charging method of a charging device according to claim 17, wherein said process of connecting said plurality of capacitors in series by controlling said changeover switches and said process of connecting said plurality of capacitors in parallel by controlling said changeover switches are performed based on a charging state of said plurality of capacitors.

19. The charging method of a charging device according to claim 15, wherein said charging current is supplied based on an AC voltage supplied from a commercial power source.

20. The charging method of a charging device according to claim 19, wherein said process of connecting said plurality of capacitors in series by controlling said changeover switches and said process of connecting said plurality of capacitors in parallel by controlling said changeover switches are performed at generating timing of said pulsating flow generated by rectifying said AC voltage.

21. The charging method of a charging device according to claim 19, wherein said process of connecting said plurality of capacitors in series by controlling said changeover switches and said process of connecting said plurality of capacitors in parallel by controlling said changeover switches are performed at generating timing of said pulsating flow generated by rectifying said AC voltage and based on a charging state of said plurality of capacitors.

22. The charging device according to claim 15, wherein each of said plurality of capacitors is an electrical double layer capacitor.

23. The charging device according to claim 15, wherein said connection control means in said capacitor bank performs repetitively at predetermined time intervals the charging operation for connecting said plurality of capacitors in series and to said power source means, and the voltage monitoring operation for connecting said plurality of capacitors in parallel and disconnecting said plurality of capacitors from said power source means, thereby detecting and monitoring the voltage charged in said plurality of capacitors by using said voltage monitoring means.

24. The charging device according to claim 15, wherein:
   said connection switching means in said capacitor bank has changeover switches respectively connected to said plurality of capacitors in said capacitor bank; and
   said connection control means connects said plurality of capacitors in series during the charging operation and in parallel during said voltage monitoring operation by controlling said changeover switches.

25. The charging device according to claim 24, wherein said connection control means switches said plurality of capacitors from a serial connection state to a parallel connection state and vice versa by controlling said changeover switches based on a charging state of said plurality of capacitors in said capacitor bank.

26. The charging device according to claim 15, wherein said power source means supplies said charging current based on an AC voltage supplied from a commercial power source.

27. The charging device according to claim 26, wherein said power source means includes:
   rectifying means for generating and outputting a pulsating flow having a predetermined voltage cycle by rectifying said AC voltage; and
   charging control means for comparing an input voltage on said pulsating flow generated by said rectifying means with a preset reference voltage, so that said charging current is supplied when said input voltage is equal to or below said reference voltage.

28. The charging device according to claim 27, wherein said charging control means includes, on a supply path of said charging current:
   current limiting means for limiting a value of said charging current;
   switching means for starting and stopping supply of said charging current; and
   countercurrent preventing means for preventing a current from flowing inversely from said plurality of capacitors,
   whereby said charging control means compares the input voltage on said pulsating flow generated by said rectifying means with the preset reference voltage, and supplies said charging current when said input voltage is equal to or below said reference voltage by allowing said switching means to conduct.

29. The charging device according to claim 26, wherein:
   said power source means includes rectifying means for generating and outputting a pulsating flow having a predetermined voltage cycle by rectifying said AC voltage; and
   said power source means detects a difference between an input voltage on said pulsating flow generated by said rectifying means and an output voltage to said plurality of capacitors, and supplies said charging current when said difference is in a predetermined voltage range.

30. The charging device according to claim 29, wherein said charging control means includes, on a supply path of said charging current:
   current limiting means for limiting a value of said charging current;
   switching means for starting and stopping supply of said charging current; and
   countercurrent preventing means for preventing a current from flowing inversely from said plurality of capacitors,
   whereby said charging control means detects a difference between the input voltage on said pulsating flow generated by said rectifying means and the output voltage to said plurality of capacitors, and supplies said charging current when said difference is within the predetermined voltage range by allowing said switch means to conduct.

31. The charging device according to claim 26, wherein:
   said connection switching means in said capacitor bank includes changeover switches respectively connected to said plurality of capacitors in said capacitor bank; and
   said connection control means switches said plurality of capacitors from a serial connection state to a parallel connection state and vice versa by controlling said changeover switches based on a waveform of the AC voltage in said power source means.

32. The charging device according to claim 26, wherein:
   said connection switching means in said capacitor bank includes changeover switches respectively connected to said plurality of capacitors in said capacitor bank; and
   said connection control means switches said plurality of capacitors from a serial connection state to a parallel connection state and vice versa by controlling said changeover switches based on a waveform of the AC voltage in said power source means and a charging state of said plurality of capacitors.

33. A charging method of a charging device for charging a plurality of capacitors in a capacitor bank by supplying a predetermined charging current, comprising:
   a process of connecting said plurality of capacitors in said capacitor bank in series and charging said plurality of capacitors by supplying a charging current from power source means;
   a process of reconnecting said plurality of capacitors in parallel at predetermined timing to detect and monitor a charged voltage therein; and
   a process of comparing said charged voltage detected with a preset reference voltage to stop supply of the charging current to said plurality of capacitors from said power source means when said charged voltage reaches or exceeds said reference voltage;
   wherein said charging current is supplied based on an AC voltage;
   wherein said process of supplying said changing current includes:
      a process of generating a pulsating flow having a predetermined voltage cycle by rectifying said AC voltage; and
      a process of detecting a difference between an input voltage on said pulsating flow and an output voltage to said plurality of capacitors, and supplying said charging current when said difference is within a predetermined voltage range.

* * * * *

UNITED STATES PATENT AND TRADEMARK OFFICE
CERTIFICATE OF CORRECTION

PATENT NO.   : 6,323,623 B1
DATED        : November 27, 2001
INVENTOR(S)  : Kaoru Someya et al.

It is certified that error appears in the above-identified patent and that said Letters Patent is hereby corrected as shown below:

<u>Title page,</u>
Item [57], ABSTRACT,
Line 23, after "possible to", add -- further downsize the charging device. --.

Signed and Sealed this

Ninth Day of September, 2003

JAMES E. ROGAN
*Director of the United States Patent and Trademark Office*